United States Patent
Kim et al.

(10) Patent No.: US 10,802,341 B2
(45) Date of Patent: Oct. 13, 2020

(54) COLOR CONVERSION PANEL AND DISPLAY DEVICE INCLUDING THE SAME

(71) Applicant: Samsung Display Co., Ltd., Yongin-si (KR)

(72) Inventors: Kang Uk Kim, Hwaseong-si (KR); Sang Ji Park, Seoul (KR); Hae Ju Yun, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 56 days.

(21) Appl. No.: 15/880,421

(22) Filed: Jan. 25, 2018

(65) Prior Publication Data

US 2019/0025655 A1    Jan. 24, 2019

(30) Foreign Application Priority Data

Jul. 19, 2017 (KR) .......................... 10-2017-0091512

(51) Int. Cl.
  *G02F 1/13357* (2006.01)
  *G02F 1/1335* (2006.01)
  *F21V 8/00* (2006.01)

(52) U.S. Cl.
  CPC ..... *G02F 1/133617* (2013.01); *G02B 6/0051* (2013.01); *G02B 6/0053* (2013.01); *G02B 6/0055* (2013.01); *G02F 1/133512* (2013.01); *G02F 1/133514* (2013.01);
  (Continued)

(58) Field of Classification Search
  CPC .............................................. G02F 1/133617
  See application file for complete search history.

(56) References Cited

U.S. PATENT DOCUMENTS

| | | | |
|---|---|---|---|
| 2008/0001528 A1* | 1/2008 | Eida | H01J 29/89 313/501 |
| 2014/0160408 A1* | 6/2014 | Cho | G02F 1/133617 349/110 |

(Continued)

FOREIGN PATENT DOCUMENTS

| | | |
|---|---|---|
| EP | 3309604 | 4/2018 |
| KR | 10-2016-0015480 | 2/2016 |

(Continued)

OTHER PUBLICATIONS

European Search Report dated Nov. 6, 2018, issued in European Patent Application No. 18180453.5.

*Primary Examiner* — Edmond C Lau
(74) *Attorney, Agent, or Firm* — H.C. Park & Associates, PLC

(57) ABSTRACT

A color conversion panel for a display device includes: a substrate including a first region, a second region, and a third region; a light-blocking partition disposed on the substrate and having a plurality of openings via which the first region, the second region and the third region are exposed; color conversion patterns disposed on the substrate in the openings in the first region and in the second region, respectively; and a light-transmitting layer containing scattering particles and including a first portion disposed in the opening in the third region and a second portion disposed to cover the color conversion patterns on the substrate. The scattering particles increase the efficiency of color conversion, such that color gamut may be increased.

29 Claims, 15 Drawing Sheets

(52) U.S. Cl.
CPC ............. *G02F 1/133504* (2013.01); *G02F 2001/133614* (2013.01); *G02F 2202/36* (2013.01); *G02F 2203/34* (2013.01)

(56) References Cited

U.S. PATENT DOCUMENTS

| | | | |
|---|---|---|---|
| 2015/0285969 A1* | 10/2015 | Kim | G02B 5/201 |
| | | | 359/891 |
| 2016/0155789 A1* | 6/2016 | Kim | H01L 27/3272 |
| | | | 257/40 |
| 2016/0195774 A1* | 7/2016 | Lee | G02F 1/133617 |
| | | | 349/43 |
| 2017/0192295 A1 | 7/2017 | Kim et al. | |
| 2018/0017829 A1 | 1/2018 | Chae et al. | |
| 2018/0107028 A1 | 4/2018 | Jung et al. | |
| 2018/0164640 A1 | 6/2018 | Kim et al. | |

FOREIGN PATENT DOCUMENTS

| | | |
|---|---|---|
| KR | 10-2018-0008950 | 1/2018 |
| KR | 10-2018-0066936 | 6/2018 |
| KR | 10-2018-0092326 | 8/2018 |

\* cited by examiner

COLOR CONVERSION PANEL AND DISPLAY DEVICE INCLUDING THE SAME

CROSS-REFERENCE TO RELATED APPLICATION

This application claims priority from and the benefit of Korean Patent Application No. 10-2017-0091512 filed on Jul. 19, 2017, which is hereby incorporated by reference for all purposes as if fully set forth herein.

BACKGROUND

Field

Exemplary implementations of the invention relate to a color conversion panel and to a display device including the same.

Discussion of the Background

A liquid-crystal display (LCD) device is one of the most commonly used display devices. An LCD device displays an image by applying a voltage across a liquid-crystal layer to control the orientation of liquid-crystal molecules in the liquid-crystal layer, thereby controlling the amount of light transmitting through the liquid-crystal layer in each of the pixels.

In such an LCD device, the display panel is a non-self luminous element that cannot emit light on its own, and thus a backlight unit for supplying light to the display panel is required.

The backlight unit may include a light-emitting unit, a light guide panel for guiding the light produces from the light-emitting unit toward the display panel, and optical sheets for controlling the path of light exiting from the light guide panel.

Examples of the optical sheets may include a diffusion sheet and a prism sheet. The diffusion sheet diffuses the light emitted from the light guide panel. The prism sheet refracts the light provided from the diffusion sheet so that the light propagates in the substantially vertical direction.

As a result, the condensed light (hereinafter referred to as vertically incident light) can be incident on the display panel in the vertical direction. In order for each pixel to produce a color, there is a known method where a color conversion pattern is disposed in each pixel.

For example, the color conversion pattern may change the color of incident light by using photoluminescent materials such as quantum dots.

Unfortunately, when the light vertically incident on the display panel passes through the color conversion pattern, a number of photons of the incident light may pass by the photoluminescent materials.

When this happens, the efficiency of color conversion by the color conversion pattern may decrease. As a result, the color gamut of the liquid-crystal display device may be deteriorated.

The above information disclosed in this Background section is only for enhancement of understanding of the background of the inventive concept, and, therefore, it may contain information that does not constitute prior art.

SUMMARY

Exemplary embodiments of the present invention may provide a color conversion panel with improved color gamut by way of increasing the efficiency of the color conversion by a color conversion pattern, and a display device including the same.

Additional aspects will be set forth in the detailed description which follows, and, in part, will be apparent from the disclosure, or may be learned by practice of the inventive concepts.

In an exemplary embodiment, a color conversion panel includes: a substrate including a first region, a second region, and a third region; a light-blocking partition disposed on the substrate and having a plurality of openings configured to expose the first region, the second region, and the third region; color conversion patterns disposed on the substrate in the openings in the first region and in the second region, respectively; and a light-transmitting layer containing scattering particles and including a first portion disposed in the opening in the third region and a second portion disposed to cover the color conversion patterns on the substrate.

The color conversion patterns may be interposed between the substrate and the second portion.

A vertical distance from a surface of the substrate to a highest point of each of the color conversion patterns may be equal to or less than a vertical distance from the surface of the substrate to a highest point of the light-blocking partition.

The first portion may be continuously connected to the second portion.

The light-blocking partition between the first region and the second region may have a ratio of b to a (b/a) being 0.5 or less, where a denotes a minimum width between a boundary at which a surface of the color conversion pattern disposed in the first region meets the light-blocking partition and a boundary at which a surface of the color conversion pattern disposed in the second region meets the light-blocking partition, and b denotes a thickness of a portion of the light-transmitting layer overlapping the light-blocking partition.

The first portion may be spaced apart from the second portion.

A surface of the light-blocking partition may be flush with a surface of the second portion overlapping with the color conversion pattern.

The second portion may cover a part of a surface of the light-blocking partition.

The light-blocking partition may have a shape that becomes narrower away from the substrate toward the color conversion pattern or a shape that becomes wider away from the substrate toward the color conversion pattern.

The light-blocking partition may contain a black material.

The light-blocking partition may comprise a transparent material layer, and a reflective layer surrounding the transparent material layer.

The light-blocking partition may comprise a black material layer disposed between the substrate and the transparent material or on the reflective layer.

The color conversion panel may comprise quantum dots that convert light of a color into light of a different color.

The color conversion pattern may comprise scattering particles.

The color conversion patterns may comprise a red color conversion pattern disposed in the opening in the first region, and a green color conversion pattern disposed in the opening in the second region.

The green color conversion pattern may extend to cover the red color conversion pattern, and the green color conversion pattern may be interposed between the second portion of the light-transmitting layer and the red color conversion pattern in the first region.

The color conversion panel may further comprise: a light-filtering pattern disposed between the substrate and the color conversion patterns.

The light-filtering pattern may be a blue cut-off filter.

In another exemplary embodiment, a display device includes: first and second substrates including a first pixel region, a second pixel region, and a third pixel region and facing each other; a liquid-crystal layer disposed between the first substrate and the second substrate; a light-blocking partition disposed on a surface of the second substrate that faces the liquid-crystal layer and having a plurality of openings configured to expose the first pixel region, the second pixel region and the third pixel region; color conversion patterns disposed on the surface of the second substrate in the openings in the first pixel region and in the second pixel region, respectively; and a light-transmitting layer containing scattering particles and including a first portion disposed in the opening in the third pixel region and a second portion disposed to cover the color conversion patterns on the surface of the second substrate.

The color conversion patterns may be interposed between the second substrate and the second portion.

A vertical distance from the surface of the second substrate to a highest point of each of the color conversion patterns may be equal to or less than a vertical distance from the surface of the second substrate to a highest point of the light-blocking partition.

The first portion may be continuously connected to the second portion.

The light-blocking partition between the first pixel region and the second pixel region may have a ratio of b to a (b/a) being 0.5 or less, where a denotes a minimum width between a boundary at which a surface of the color conversion pattern disposed in the first region meets the light-blocking partition and a boundary at which a surface of the color conversion pattern disposed in the second region meets the light-blocking partition, and b denotes a thickness of a portion of the light-transmitting layer overlapping the light-blocking partition.

The first portion may be spaced apart from the second portion.

A surface of the light-blocking partition may be flush with a surface of the second portion overlapping with the color conversion patterns.

The second portion may cover a part of a surface of the light-blocking partition.

The color conversion patterns may comprise a red color conversion pattern disposed in the opening in the first pixel region, and a green color conversion pattern disposed in the opening in the second pixel region.

The green color conversion pattern may extend to cover the red color conversion pattern, and the green color conversion pattern may be interposed between the second portion of the light-transmitting layer and the red color conversion pattern in the first pixel region.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
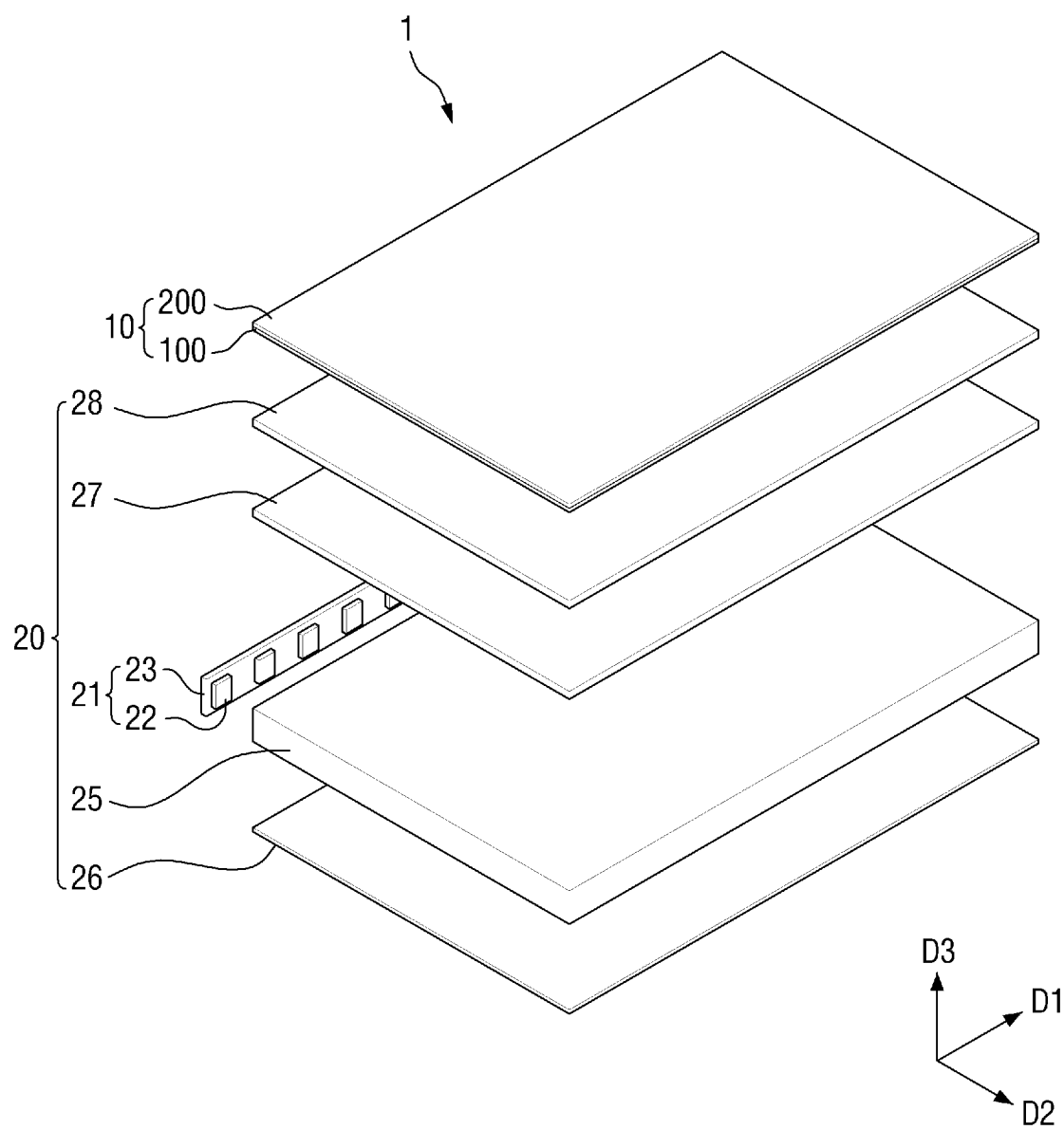
FIG. 1 is an exploded, perspective view of a display device according to an exemplary embodiment.

In the following description, for the purposes of explanation, numerous specific details are set forth in order to provide a thorough understanding of various exemplary embodiments or implementations of implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the scope of the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the scope of the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
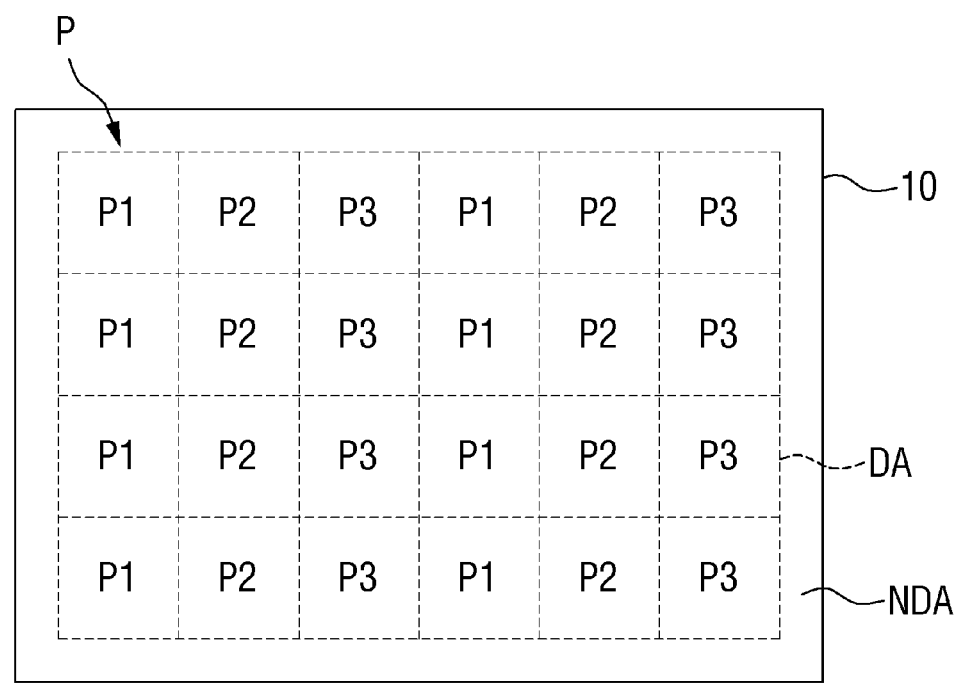
FIG. 2 is a layout diagram of the display panel shown in FIG. 1.
Figure 2:
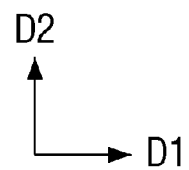

FIG. 1 is an exploded, perspective view of a display device according to an exemplary embodiment. FIG. 2 is a layout diagram of the display panel shown in FIG. 1.

Referring to FIG. 1, a display device 1 includes a display panel 10 for displaying an image using light, and a backlight unit 20 for generating light to provide it to the display panel 10. The backlight unit 20 may be disposed behind the display panel 10 to provide light to the display panel 10.

The display panel 10 may be a liquid-crystal display panel including a liquid-crystal layer. The display panel 10 may include a first display panel 100 and a second display panel 200 (or a color conversion panel) facing each other. The first display panel 100 and the second display panel 200 may be coupled with each other by a sealant (not shown). A liquid-crystal layer 300 (see FIG. 4) may be interposed between the first display panel 100 and the second display panel 200.

As shown in FIG. 2, the display panel 10 may include a display area DA including a plurality of pixels P arranged in a matrix, and a non-display area NDA located outside the display area DA.

The plurality of pixels P may include a first pixel region P1 (or a first region), a second pixel region P2 (or a second region), and a third pixel region P3 (or a third region) arranged in a first direction D1.

The first pixel region P1, the second pixel region P2, and the third pixel region P3 may emit light of different colors. For example, the first pixel region P1 may be a red pixel region emitting red light, the second pixel region P2 may be a green pixel region emitting green light, and the third pixel region P3 bay be a blue pixel region emitting blue light.

The backlight unit 20 may be, but is not limited to, an edge-lit backlight unit. The backlight unit 20 may include a light source unit 21, a light guide panel 25, a reflective sheet 26, a diffusion sheet 27, a prism sheet 28, and the like.

The light source unit 21 may include a plurality of light sources 22 for generating light to be provided to the display panel 10, for example, LEDs (light-emitting diodes), and a printed circuit board 23 for supplying power to drive the plurality of light sources 22.

In an exemplary embodiment, the light sources 22 may emit blue light. The blue light may have a wavelength in the range of approximately 430 nm to 470 nm. In this case, the light source unit 21 may provide blue light to the display panel 10. In another exemplary embodiment, the light source 22 may emit ultraviolet light, in which case the light source unit 21 may provide ultraviolet light to the display panel 10.

The light guide panel 25 may be disposed on the side of the light source unit 21 and guides light generated by the light source unit 21 toward the display panel 10 in the third direction D3.

The reflective sheet 26 may be disposed under the light guide panel 25 and reflects back light exiting downwardly of the light guide panel 25.

The diffusion sheet 27 may be disposed on the light guide panel 25 and serves to diffuse the light provided from the light guide panel 25.

The prism sheet 28 may be disposed on the diffusion sheet 27 and may condense the light diffused in the diffusion sheet 27 so that it propagates upwardly in the direction perpendicular to the plane. After having passed through the prism sheet 28, the condensed light may be incident on the display panel 10 in the vertical direction (i.e., normal to the display panel 10).

Although the edge-lit backlight unit 20 has been described in the exemplary embodiment, a direct-lit backlight unit may also be used for the display device 1. When a direct-lit backlight unit is employed, a plurality of light sources may be disposed under the reflective sheet, without the light guide panel. Further, the reflective sheet may include a plurality of holes into which the light sources may be inserted.

Hereinafter, the structure of the display panel will be described in detail.

Figure 3:
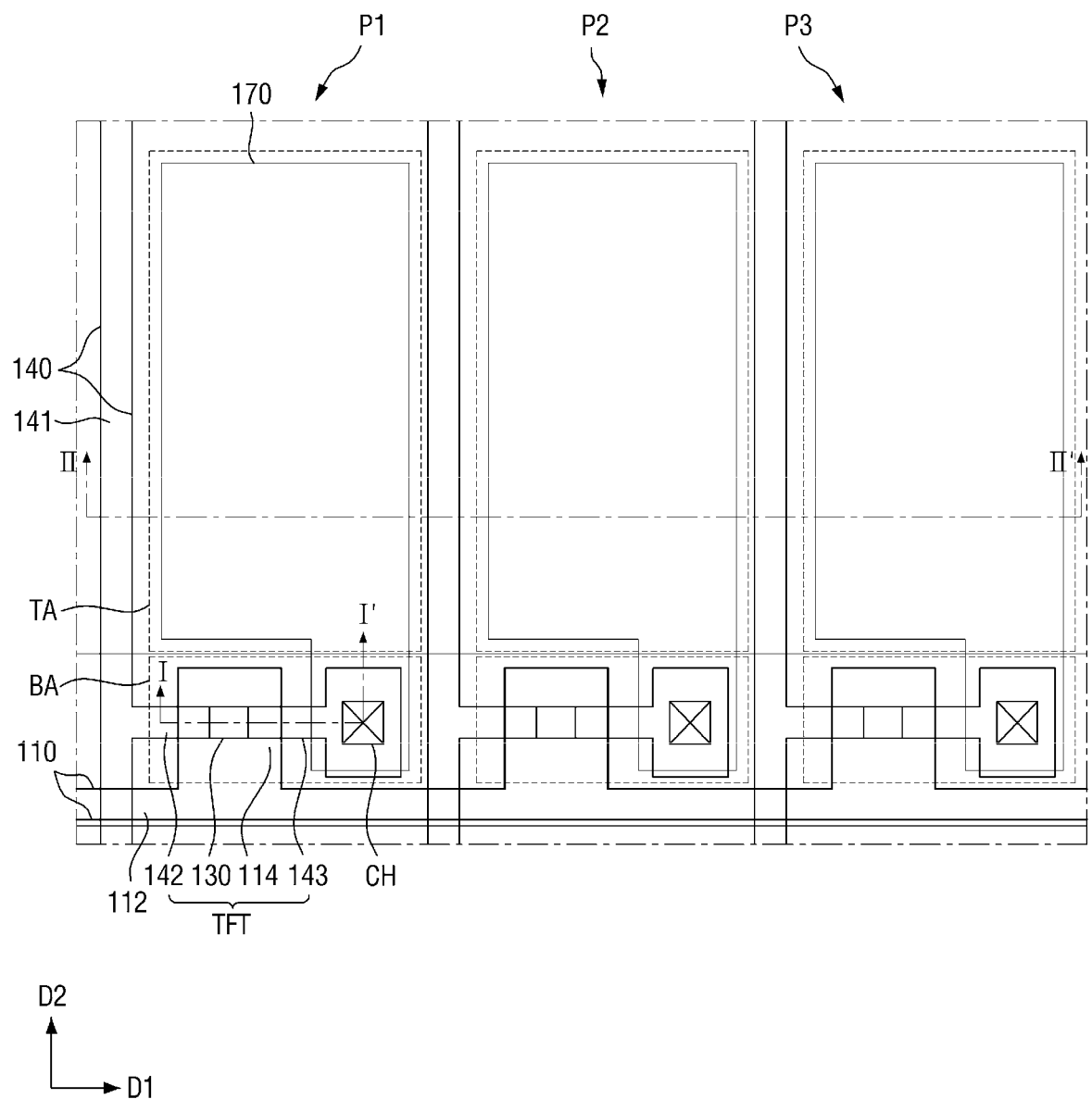
FIG. 3 is a plan view of three pixel regions for illustrating the display panel of FIG. 2.
Figure 4:
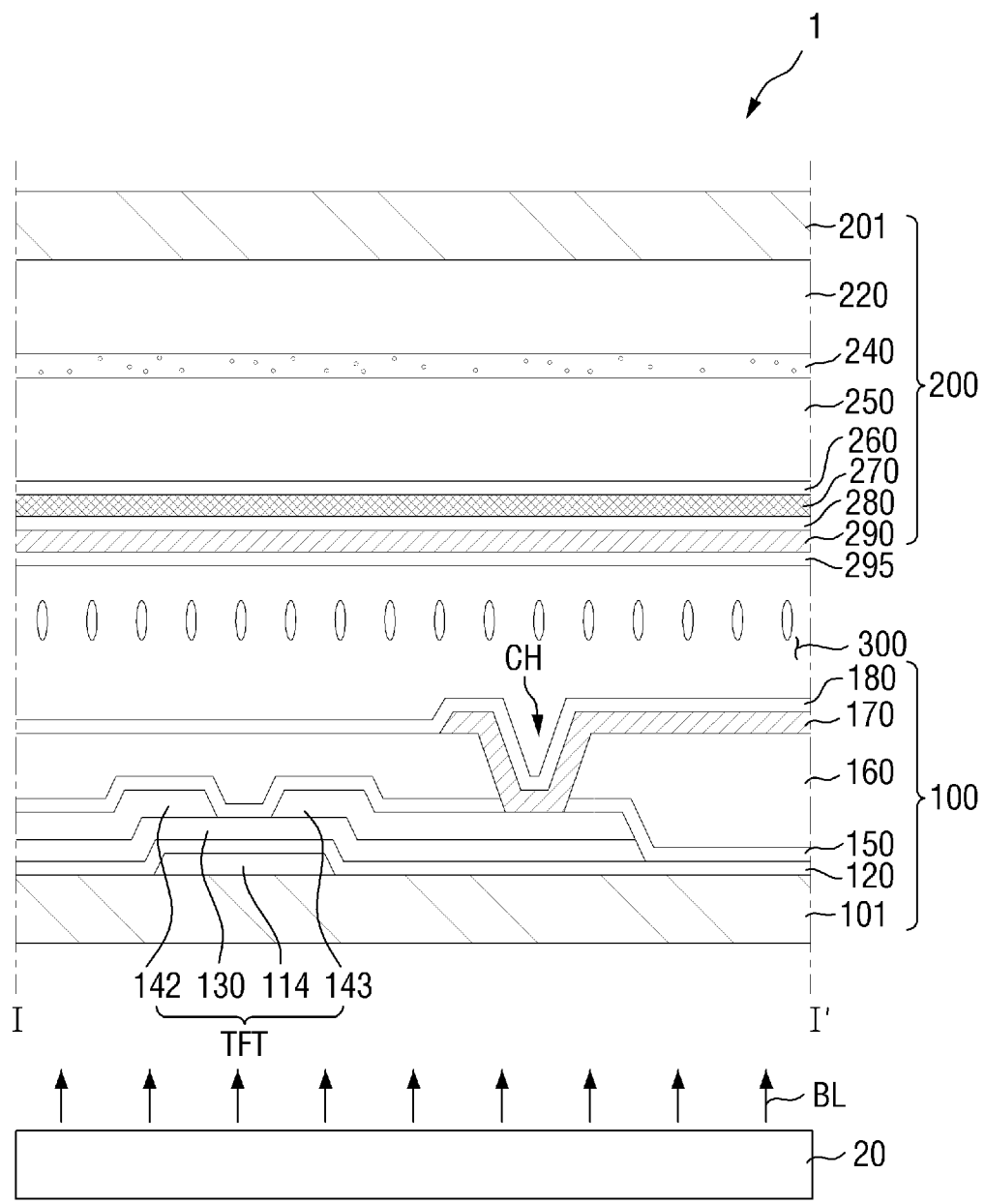
FIG. 4 is a cross-sectional view taken along line I-I' of FIG. 3.
Figure 5:
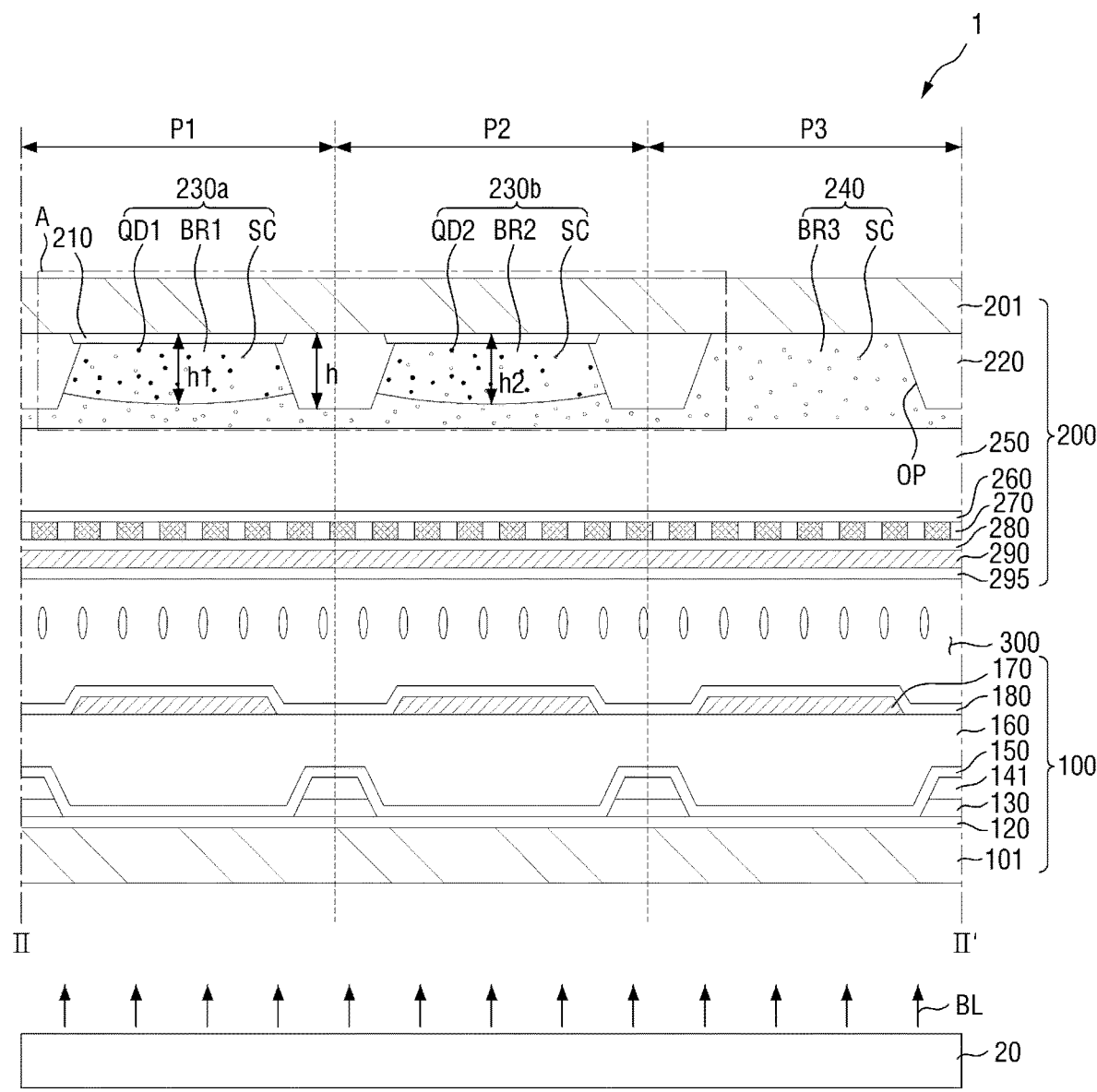
FIG. 5 is a cross-sectional view taken along line II-II' of FIG. 3.
Figure 6:
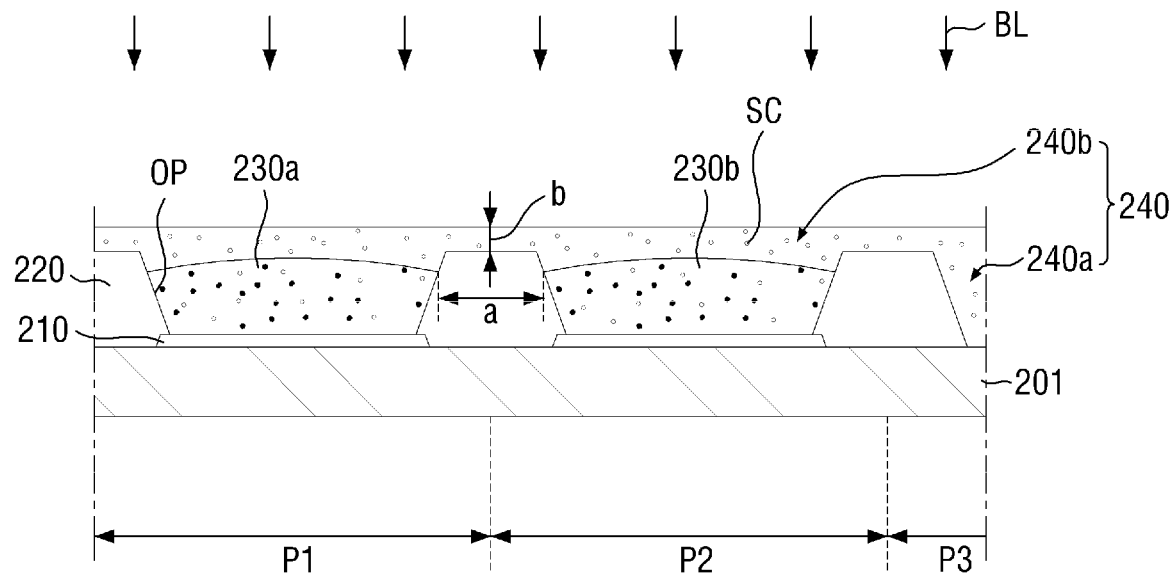
FIG. 6 is an enlarged cross-sectional view of area A of FIG. 5.
Figure 7:
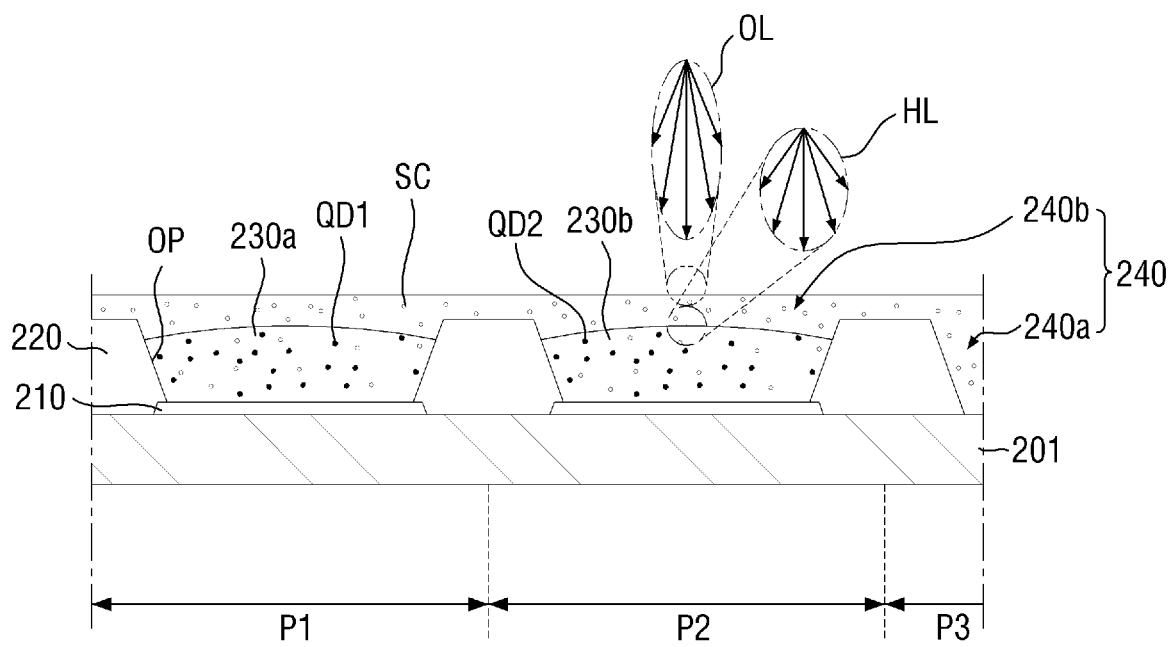
FIG. 7 is a cross-sectional view showing a profile of light incident on a light-transmitting layer and a profile of light incident on a color conversion pattern after the light-transmitting layer in area A of FIG. 5.

FIG. 3 is a plan view of three pixel regions for illustrating the display panel of FIG. 2. FIG. 4 is a cross-sectional view taken along line I-I' of FIG. 3. FIG. 5 is a cross-sectional view taken along line II-II' of FIG. 3. FIG. 6 is an enlarged cross-sectional view of area A of FIG. 5. FIG. 7 is a cross-sectional view showing a profile of light incident on a light-transmitting layer and a profile of light incident on a color conversion pattern after the light-transmitting layer in area A of FIG. 5.

Referring to FIGS. 3, 4, and 5, the display device 1 according to the exemplary embodiment includes the first display panel 100, the second display panel 200 facing the first display panel 100, the sealant (not shown) for attaching the first display panel 100 and the second display panel 200 together, and the liquid-crystal layer 300 positioned between the first display panel 100 and the second display panel 200, as described above.

The first display panel 100 may include a first substrate 101, a gate wiring 110, a gate insulating layer 120, a semiconductor layer 130, a data wiring 140, a passivation layer 150, a planarization layer 160, a pixel electrode 170 (or a first electrode), and a first alignment layer 180.

The first substrate 101 may include the display area DA and the non-display area NDA (see FIG. 2). The display area DA may include the pixel regions P (see FIG. 2). In each of the pixel regions P, pixel elements for driving a pixel may be disposed (see FIG. 2). Each of the pixel regions P, for example, a first pixel region P1, may include a light-transmitting area TA and a light-blocking area BA. The pixel electrode 170 to be described later may be disposed in the light-transmitting area TA of the first pixel region P1. A switching element to be described later may be disposed on the light-blocking area BA. The switching element may be, for example, a thin-film transistor (TFT).

The first substrate 101 may be made of transparent glass or plastic.

The gate wiring 110 may be disposed on the first substrate 101 in the light-blocking area BA, and may transmit a gate signal. The gate wiring 110 may include a gate line 112 extending in the first direction D1, and a gate electrode 114 protruding from the gate line 112 in a direction different from the first direction D1. The gate electrode 114 may form a thin-film transistor TFT together with the semiconductor layer 130, the source electrode 142, and the drain electrode 143 to be described later.

The gate wiring 110 may include: an aluminum-based metal such as aluminum (Al) and an aluminum alloy; a silver-based metal such as silver (Ag) and a silver alloy; a copper-based metal such as copper (Cu) and a copper alloy; a molybdenum-based metal such as molybdenum (Mo) and a molybdenum alloy; chrome (Cr); titanium (Ti); and tantalum (Ta).

In addition, the gate wiring 110 may have a multi-layer structure of conductive layers (not shown) having different physical properties. One of the conductive layers may be formed of a metal having a low resistivity metal such as an aluminum-based metal, a silver-based metal, and a copper-based metal, so as to reduce signal delay or voltage drop of the gate wiring 110.

The other conductive layer may be formed of a material having excellent contact properties with other materials, particularly indium tin oxide (ITO) and indium zinc oxide (IZO), such as molybdenum-based metals, chromium, titanium, and tantalum. Examples of combinations of the conductive layers may include a chromium lower layer and an aluminum upper layer, an aluminum lower layer and a molybdenum upper layer, and a titanium lower layer and a copper upper layer. It is to be noted that this is merely illustrative, and the gate wiring 110 may be formed of various metals and conductors.

The gate insulating layer 120 may be disposed on the first substrate 101 so as to cover the gate wiring 110. The gate insulating layer 120 may also be disposed in the non-display area NDA of the first substrate 101 as well as the display area DA (see FIG. 2). The gate insulating layer 120 may include silicon oxide (SiOx) or silicon nitride (SiNx). The gate insulating layer 120 may further include aluminum oxide, titanium oxide, tantalum oxide, or zirconium oxide.

The semiconductor layer 130 may be disposed on the gate insulating layer 120 and forms a channel of the thin-film transistor TFT. The semiconductor layer 130 may be disposed so that it overlaps at least the gate electrode 114. In an exemplary embodiment, the semiconductor layer 130 may be disposed so that it overlaps the data wiring 140 to be described later. The semiconductor layer 130 may be formed of an amorphous silicon or an oxide semiconductor including at least one elements of gallium (Ga), indium (In), tin (Sn), and zinc (Zn).

The data wiring 140 may be disposed on the semiconductor layer 130. The data wiring 140 may include the data line 141, the source electrode 142, and the drain electrode 143.

The data line 141 may be extended in a second direction D2 intersecting with the direction in which the gate line 112 is extended (first direction D1). The source electrode 142 may branch off from the data line 141 and may be extended to the semiconductor layer 130 overlapping with the gate electrode 114. The drain electrode 143 may be spaced apart from the source electrode 142 and may be disposed on the semiconductor layer 130, with the gate electrode 114 or the channel of the thin-film transistor TFT between the drain electrode 143 and the source electrode 142. The drain electrode 143 may be extended on the semiconductor layer 130 such that it overlaps with a part of the pixel electrode 170.

The passivation layer 150 may be disposed on the gate insulating layer 120, the semiconductor layer 130, the source electrode 142, and the drain electrode 143. The passivation layer 150 may also be disposed in the non-display area NDA of the first substrate 101 as well as the display area DA (see FIG. 2). The passivation layer 150 may include an inorganic insulation material such as silicon oxide, silicon nitride, and silicon oxynitride. The passivation layer 150 may protect the thin-film transistor (TFT).

The planarization layer 160 may be disposed on the passivation layer 150. The planarization layer 160 may electrically isolate the elements thereon from the elements thereunder and may provide a flat surface. In an exemplary embodiment, the planarization layer 160 may be made of an organic material.

The pixel electrode 170 may be disposed on the planarization layer 160. The pixel electrode 170 may overlap with the light-transmitting area TA. A portion of the pixel electrode 170 may extend to overlap the light-blocking area BA and may be physically and electrically connected to the drain electrode 143 via the contact hole CH.

The pixel electrode 170 may include a transparent conductive material. For example, the pixel electrode 170 may include a metal oxide such as indium zinc oxide, indium tin oxide, tin oxide, and zinc oxide.

The first alignment layer 180 may be disposed on the pixel electrode 170. The first alignment layer 180 may include a photoreactive material. The first alignment layer 180 may be formed of one of polyimide, polyamic acid, and polysiloxane.

Although not shown in the drawings, but understood by one of ordinary skill in the art, a first polarizer may be disposed between the backlight unit 20 and the liquid-crystal layer 300. The first polarizer may be an absorptive polarizer or a reflective polarizer. For example, the absorptive polarizer may polarize the transmitted light by absorbing components parallel to the absorption axis while transmitting components parallel to the transmission axis.

The second display panel 200 may include a second substrate 201, a light-filtering pattern 210, a light-blocking partition 220, color conversion patterns 230a and 230b, a light-transmitting layer 240, an overcoat layer 250, a protective layer 260, a second polarizer 270, a capping layer 280, a common electrode 290 (or a second electrode), and a second alignment layer 295.

The second substrate 201 may be made of transparent glass or plastic.

The light-filtering pattern 210 may be disposed in some pixel regions on the second substrate 201, for example, the first pixel regions P1 and the second pixel regions P2. The light-filtering pattern 210 may filter light of an undesired color when the light is emitted from the backlight unit 20 toward the second substrate 201 through the color conversion patterns 230a and 230b, to be described later. For example, the light-filtering pattern 210 may be a blue cut-off filter (BCF) that filters blue light.

The light-blocking partition 220 may be disposed on the second substrate 201. The light-blocking partition 220 may be disposed at every boundary between adjacent pixel regions P1, P2, and P3, and may be disposed in a substantially rectangular lattice shape when viewed from the top. That is, the light-blocking partition 220 may have a plurality of openings OP to expose the pixel regions P1, P2, and P3 on the second substrate 201. For example, when the light-filtering pattern 210 is disposed on the second substrate 201 in each of the first pixel region P1 and the second pixel region P2, the light-blocking partition 220 may expose the light-filtering pattern 210 via the opening OP. In the third pixel region P3, the light-blocking partition 220 may expose a part of the second substrate 201.

The light-blocking partition 220 may block transmission of light to prevent undesirable color mixing between adjacent pixel areas P1, P2, and P3. The light-blocking partition 220 is not particularly limited as long as it can block transmission of light. For example, it may be formed of a black material.

The color conversion patterns 230a and 230b may be disposed on the light-filtering pattern 210. The color conversion patterns 230a and 230b may convert incident light provided from the backlight unit 20 into a color different from the color of the incident light and emit it toward the second substrate 201. That is, the color conversion patterns 230a and 230b can change the wavelength of the incident light and emit light of a color different from that of the incident light (wavelength shift). In the following description, it is assumed that the light provided from the backlight unit 20 is blue light BL.

The color conversion patterns 230a and 230b may include a red color conversion pattern 230a disposed in the opening OP of the light-blocking partition 220 in the first pixel region P1, and a green color conversion pattern 230b disposed in the opening of the light-blocking partition 220 in the second pixel region P2.

The red color conversion pattern 230a and the green color conversion pattern 230b may include wavelength shift material, for example, quantum dots. The quantum dots may emit light of a specific color as electrons transition from the conduction band to the valence band. The quantum dots may have a core-shell structure. The core may be semiconductor nanocrystalline material. Examples of the core of the quantum dots may include, but is not limited to, silicon (Si) type nanocrystals, II-VI group compound nanocrystals, and III-V group compound nanocrystals, etc.

The quantum dots may convert incident light into light of a specific wavelength to emit the light according to the size. For example, when the quantum dots emit red light, they may have a size of approximately 55 Å to 65 Å. When the quantum dots emit green light, they may have a size of approximately 40 Å to 50 Å. In the following description, quantum dots for emitting red light are referred to as red light quantum dots, and quantum dots for emitting green light are referred to as green light quantum dots.

The red color conversion pattern 230a may include a first base resin BR1 and red light quantum dots QD1. The red color conversion pattern 230a may convert the blue light BL provided from the backlight unit 20 into red light with the red light quantum dots QD1. That is, the red light quantum dots QD1 may shift the wavelength of the blue light BL to the wavelength of the red light, to emit the red light from the blue light BL. The light exiting through the red light quantum dots QD1 can be emitted in different directions regardless of the angle at which the light is incident on the red color conversion pattern 230a, thereby achieving a wide viewing angle.

In addition, the red color conversion pattern 230a may further include scattering particles SC. The scattering particles SC may scatter light exiting through the red light quantum dots QD1 so that more light exits through the second substrate 201. The scattering particles SC may be made of any material capable of uniformly scattering light and may include at least one selected from the group consisting of: titanium oxide ($TiO_2$), zirconium oxide ($ZrO_2$), aluminum oxide ($Al_2O_3$), indium oxide ($In_2O_3$), tin oxide ($SnO_2$), antimony oxide ($Sb_2O_3$), and hollow silica.

The red color conversion pattern 230a may be formed by inkjet printing. For example, the vertical distance h1 from one surface of the second substrate 201 to the highest point of the red color conversion pattern 230a may be equal to or less than the vertical distance h from the surface of the second substrate 201 to the highest point of the light-blocking partition 220. Herein, the highest point of the red color conversion pattern 230a may be defined as the farthest point of the red color conversion patterns 230a from the surface of the second substrate 201 in the direction perpendicular to the surface of the second substrate 201. In addition, herein, the highest point of the light-blocking partition 220 may be defined as the farthest point of the light-blocking partition 220 from the surface of the second substrate 201 in the direction perpendicular to the surface of the second substrate 201.

When the red color conversion pattern 230a is formed by ink-jet printing, the solution may contain a large amount of resin solid contents and quantum dot particles, and thus the content of the scattering particles SC that may be contained in the solution is limited.

The green color conversion pattern 230b may include a second base resin BR2 and green light quantum dots QD2. The green color conversion pattern 230b may convert the blue light BL provided from the backlight unit 20 into green light with the green light quantum dots QD2. That is, the green light quantum dots QD2 may shift the wavelength of the blue light BL to the wavelength of the green light, to emit the green light from the blue light BL. The light exiting through the green light quantum dots QD2 may be emitted in different directions regardless of the angle at which the light is incident on the green color conversion pattern 230b, thereby achieving the wide viewing angle. In addition, the green color conversion pattern 230b may also include scattering particles SC.

The green color conversion pattern 230b may also be formed by inkjet printing. For example, the vertical distance h2 from one surface of the second substrate 201 to the highest point of the green color conversion pattern 230b may be equal to or less than the vertical distance h from the surface of the second substrate 201 to the highest point of the light-blocking partition 220. Herein, the highest point of the green color conversion pattern 230b may be defined as the farthest point of the green color conversion patterns 230b from the surface of the second substrate 201 in the direction perpendicular to the surface of the second substrate 201.

When the green color conversion pattern 230b is formed by ink-jet printing, the solution may contain a large amount of resin solid contents and quantum dot particles, and thus the content of the scattering particles SC that may be contained in the solution is limited as well.

The light-transmitting layer 240 may include a first portion 240a disposed in the opening OP of the light-blocking partition 220 in the third pixel region P3, and a second portion 240b disposed to cover the color conversion patterns 230a and 230b (see FIG. 6).

The light-transmitting layer 240 may transmit the blue light BL provided from the backlight unit 20 without color conversion or after scattering it. The light-transmitting layer 240 may include a third base resin BR3 and scattering particles SC. The third base resin BR3 may be a transparent light-transmitting resin. Although not described above, the first base resin BR1 and the second base resin BR2 may be made of the same material as or different materials from the third base resin BR3. The light-transmitting layer 240 will be described later in detail.

The overcoat layer 250 may be disposed on the light-transmitting layer 240. The overcoat layer 250 may also be disposed in the non-display area NDA of the second substrate 201 as well as the display area DA (see FIG. 2). The overcoat layer 250 may be a planarizing layer that reduces level differences created by a plurality of elements stacked on the second substrate 201. The overcoat layer 250 may be formed of an organic material suitable for providing a flat surface. For example, the overcoat layer 250 may be made of a thermosetting resin. Examples of the organic material of the overcoat layer 250 may include a cardo resin, a polyimide resin, an acrylic resin, a siloxane resin, or a silsesquioxane resin.

The protective layer 260 may be disposed on the overcoat layer 250. The protective layer 260 may also be disposed in the non-display area NDA of the second substrate 201 as well as the display area DA (see FIG. 2). The protective layer 260 may be made of an inorganic material such as silicon nitride or silicon oxide. The protective layer 260 may prevent the overcoat layer 250 from being damaged in the process of forming the second polarizer 270, which will be described later. In addition, the protective layer 260 may enhance the adhesion of the second polarizer 270 and prevent damage or corrosion to the second polarizer 270 due to permeation of air or moisture, thereby improving the reliability of the display device 1. In another exemplary embodiment, the protective layer 260 may be eliminated.

The second polarizer 270 may be disposed on the protective layer 260. The second polarizer 270 may function as an optical shutter together with the first polarizer (not shown) and the liquid-crystal layer 300, to control the amount of transmitted light for each of the pixel regions P1, P2, and P3. In an exemplary embodiment, the second polarizer 270 may be a reflective polarizer including a wire grid pattern disposed directly on the protective layer 260. The wire grid pattern refers to a plurality of line extended in parallel and spaced apart from one another. In an exemplary embodiment, the second polarizer 270 may have a continuous shape without a pattern in a region except for the light-transmitting region TA of each of the pixel regions P1, P2, and P3.

The second polarizer 270 may be made of a conductive material. Examples of the conductive material may include aluminum (Al), silver (Ag), gold (Au), copper (Cu), titanium (Ti), molybdenum (Mo), nickel (Ni), or an alloy thereof.

The capping layer 280 may be disposed on the second polarizer 270. The capping layer 280 may also be disposed in the non-display area NDA of the second substrate 201 as well as the display area DA (see FIG. 2). The capping layer 280 may cover and protect the second polarizer 270. The capping layer 280 may prevent damage or corrosion to the second polarizer 270 due to permeation of air or moisture. The capping layer 280 may be made of an inorganic material such as silicon nitride or silicon oxide.

The common electrode 290 may be disposed on the capping layer 280. The common electrode 290 may also be disposed in the non-display area NDA of the second substrate 201 as well as the display area DA (see FIG. 2). The common electrode 290 may be formed of a transparent conductor such as indium tin oxide (ITO) or indium zinc oxide (IZO). A common voltage may be applied to the common electrode 290 to form an electric field together with the pixel electrode 170.

The second alignment layer 295 may be disposed on the common electrode 290. The second alignment layer 295 may be formed of the same material as the first alignment layer 180.

The liquid-crystal layer 300 may include liquid-crystal molecules having dielectric anisotropy. When an electric field is applied between the first display panel 100 and the second display panel 200, the liquid-crystal molecules may rotate in a specific direction between the first display panel 100 and the second display panel 200, to transmit or block the light.

Hereinafter, the light-transmitting layer 240 will be described in detail.

FIG. 6 is an enlarged cross-sectional view of area A of FIG. 5. FIG. 7 is a cross-sectional view showing a profile of light incident on a light-transmitting layer and a profile of light incident on a color conversion pattern after the light-transmitting layer in area A of FIG. 5.

As described above, the light-transmitting layer 240 may include the first portion 240a and the second portion 240b.

The first portion 240a may be located in the third pixel region P3 and transmit the blue light BL provided from the backlight unit 20 (see FIG. 5) without color conversion or after scattering it, such that the blue light BL may exit toward the second substrate 201.

The second portion 240b may be disposed to cover the color conversion patterns 230a and 230b. When the blue light BL provided from the backlight unit 20 (see FIG. 5) passes through the prism sheet 28 (see FIG. 1) such that the condensed incident light OL is incident in the vertical direction, the second portion 240b can scatter the incident light OL in the horizontal direction with the scattering particles (see FIG. 7).

As a result, blue light BL, which is produced as the incident light OL is scattered in the horizontal direction, may be incident on the color conversion patterns 230a and 230b. Accordingly, the light path of the blue light BL spreading in the horizontal direction may be increased, and the number of photons in contact with the quantum dots QD1 and QD2 of the color conversion patterns 230a and 230b may be increased.

As a result, the efficiency of color conversion by the color conversion patterns 230a and 230b may be increased. Specifically, the efficiency of color conversion from blue light to red light by the red color conversion pattern 230a may be increased, such that the ratio of blue light to the light having passed through the red color conversion pattern 230a may be decreased. Likewise, the efficiency of color conversion from blue light to green light by the green color conversion pattern 230a may be increased, such that the ratio of blue light to the light having passed through the green color conversion pattern 230b may be decreased.

The first portion 240a and the second portion 240b may be continuously connected to each other, that is, they may be as a single element over the light-blocking partition 220. That is, the light-transmitting layer 240 may be disposed entirely over the light-blocking partition 220 so that the opening OP of the light-blocking partition is filled with it in the third pixel region P3. Then, the light-transmitting layer 240 may be in contact with the surface of the light-blocking partition 220 at the boundary between the first pixel region P1, the second pixel region P2, and the third pixel region P3.

The light-transmitting layer 240 including the first portion 240a and the second portion 240b may be formed by inkjet printing, slit coating, and photolithography.

For example, when the light-transmitting layer 240 is formed by inkjet printing, a light-transmitting solution may be injected entirely onto the light-blocking partition 220. Accordingly, there may be an advantage in that it is not necessary to manage the process so that a light-transmitting solution does not overflow to an adjacent pixel region, e.g., the pixel region P2.

Incidentally, when the first portion 240a is continuously connected to the second portion 240b, the blue light BL provided from the backlight unit 20 (see FIG. 5) may leak to an adjacent pixel region instead of a predetermined pixel region. For example, the blue light BL provided from the backlight unit 20 (see FIG. 5) may leak to the first pixel region P1 instead of the predetermined second pixel region P2. In this case, the brightness of the green light exiting through the second pixel region P2 may undesirably decrease.

In addition, when the first portion 240a is continuously connected to the second portion 240b, the light exiting from the color conversion pattern of one pixel region may leak to an adjacent pixel region. For example, the green light exiting from the green color conversion pattern 230b of the second pixel region P2 may leak to the first portion 240a in the third pixel region P3 through the second portion 240b over the light-blocking partition 220. In this case, blue light and green light may be mixed in the third pixel region P3 and the mixed light may exit toward the second substrate 201.

Accordingly, in order to suppress leakage of light between adjacent pixels, the thickness of the second portion 240b disposed on one surface of the light-blocking partition 220 at the boundary between adjacent pixel regions among the first pixel region P1, the second pixel region P2, and the third pixel region P3 may be decreased. For example, the light-blocking partition 220 between the first pixel region P1 and the second pixel region P2 may be in a ratio of b to a (b/a) of 0.5 or less, where a denotes the minimum width of the light-blocking partition 220 at the boundary between the red color conversion pattern 230a and the green color conversion pattern 230b, and b denotes the thickness of a portion of the light-transmitting layer 240 overlapping the light-blocking partition 220. For example, a may be 20 nm, and b may be 10 nm. With the above-described numerical values, it was found that there was no leakage between adjacent pixel regions. Herein, the surface of the light-blocking partition 220 may be defined as the farthest surface of the light-blocking partition 220 from the surface of the second substrate 201 in the direction perpendicular to the surface of the second substrate 201. Herein, the surface of the red color conversion pattern 230a may be defined as a surface including the farthest point of the red color conversion patterns 230a from the surface of the second substrate 201 in the direction perpendicular to the surface of the second substrate 201. In addition, the surface of the green color conversion pattern 230b may be defined as a surface including the farthest point of the green color conversion patterns 230b from the surface of the second substrate 201 in the direction perpendicular to the surface of the second substrate 201.

Referring to FIGS. 6 and 7, the light-blocking partition 220 has a shape that becomes narrower as a distance from the second substrate 201 increases and a distance from the color conversion patterns 230a and 230b decreases, but this is not limiting.

Hereinafter, the effect of improving the efficiency of color conversion when the light-transmitting layer 240 is formed to cover the color conversion patterns 230a and 230b will be described with an example in which the light-transmitting layer 240 covers the red color conversion pattern 230a.

Figure 8:
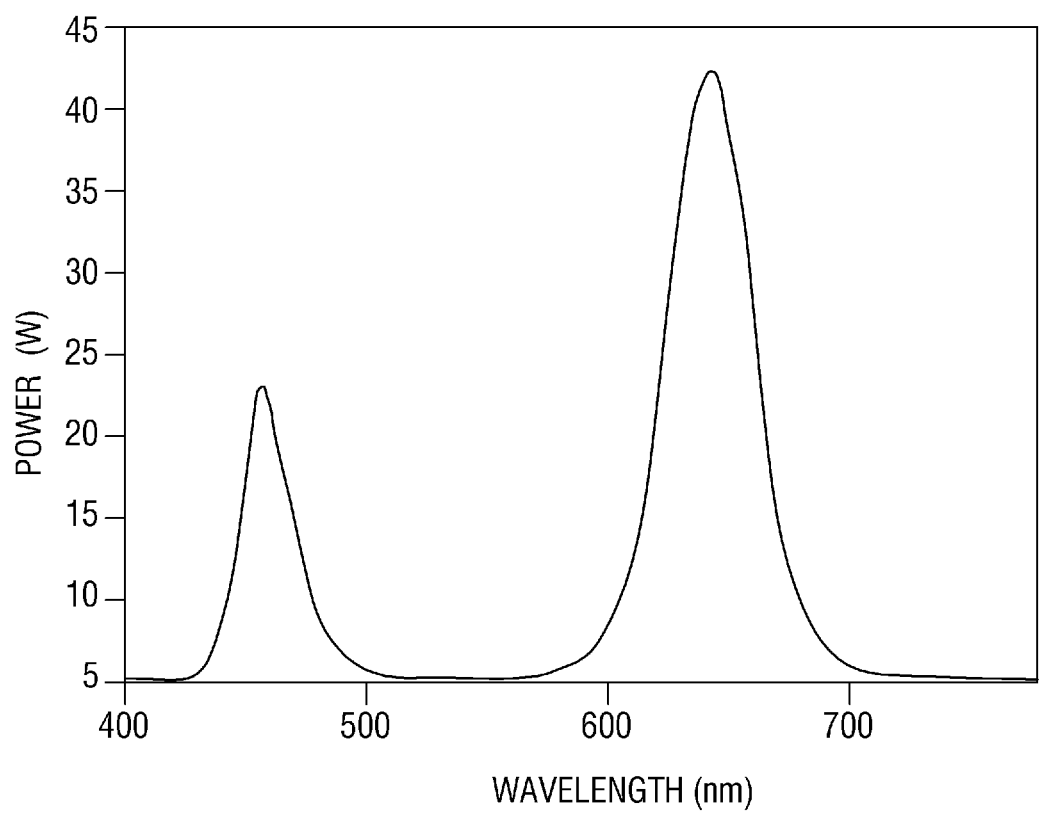
FIG. 8 is a graph showing power of light passing through the red color conversion pattern in the first pixel region versus wavelength in the structure in which the light-transmitting layer covers the red color conversion pattern, as shown in FIG. 6.
Figure 9:
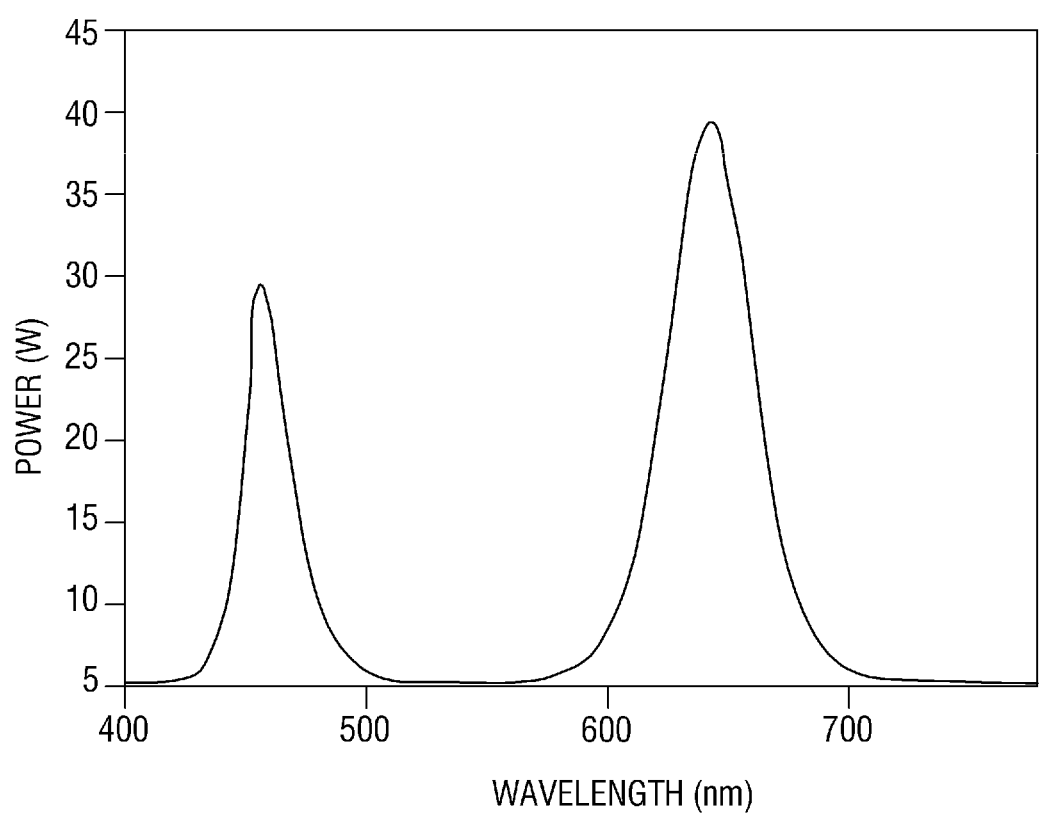
FIG. 9 is a graph showing power of light passing through the red color conversion pattern in the first pixel region versus wavelength in the structure in which the light-transmitting layer does no cover the red color conversion pattern.

FIG. 8 is a graph showing power of light passing through the red color conversion pattern in the first pixel region versus wavelength in the structure in which the light-transmitting layer covers the red color conversion pattern, as shown in FIG. 6. FIG. 9 is a graph showing power of light passing through the red color conversion pattern in the first pixel region versus wavelength in the structure in which the light-transmitting layer does no cover the red color conversion pattern.

Referring to FIG. 8, in the structure in which the light-transmitting layer 240 covers the red color conversion pattern 230a, the power of the red light having a peak wavelength of approximately 650 nm may be approximately 43 W, while the power of the blue light may be approximately 24 W in the first pixel region P1 in which the red color conversion pattern 230a is disposed.

In contrast, referring to FIG. 9, in the structure in which the light-transmitting layer does not cover the red color conversion pattern, the power of the red light having a peak wavelength of approximately 650 nm may be approximately 39 W, while the power of the blue light may be approximately 29 W in the first pixel region P1 in which the red color conversion pattern is disposed.

It can be seen from the graphs that the efficiency of color conversion from blue light to red light may be increased when the light-transmitting layer 240 including scattering particles SC is disposed on the red color conversion pattern 230a, and that the ratio of blue light to the light having passed through the red color conversion pattern 230a may be decreased.

Hereinafter, the effect of improving the efficiency of color conversion and in turn color gamut achieved when the light-transmitting layer 240 covers the color conversion patterns 230a and 230b will be described.

Figure 10:
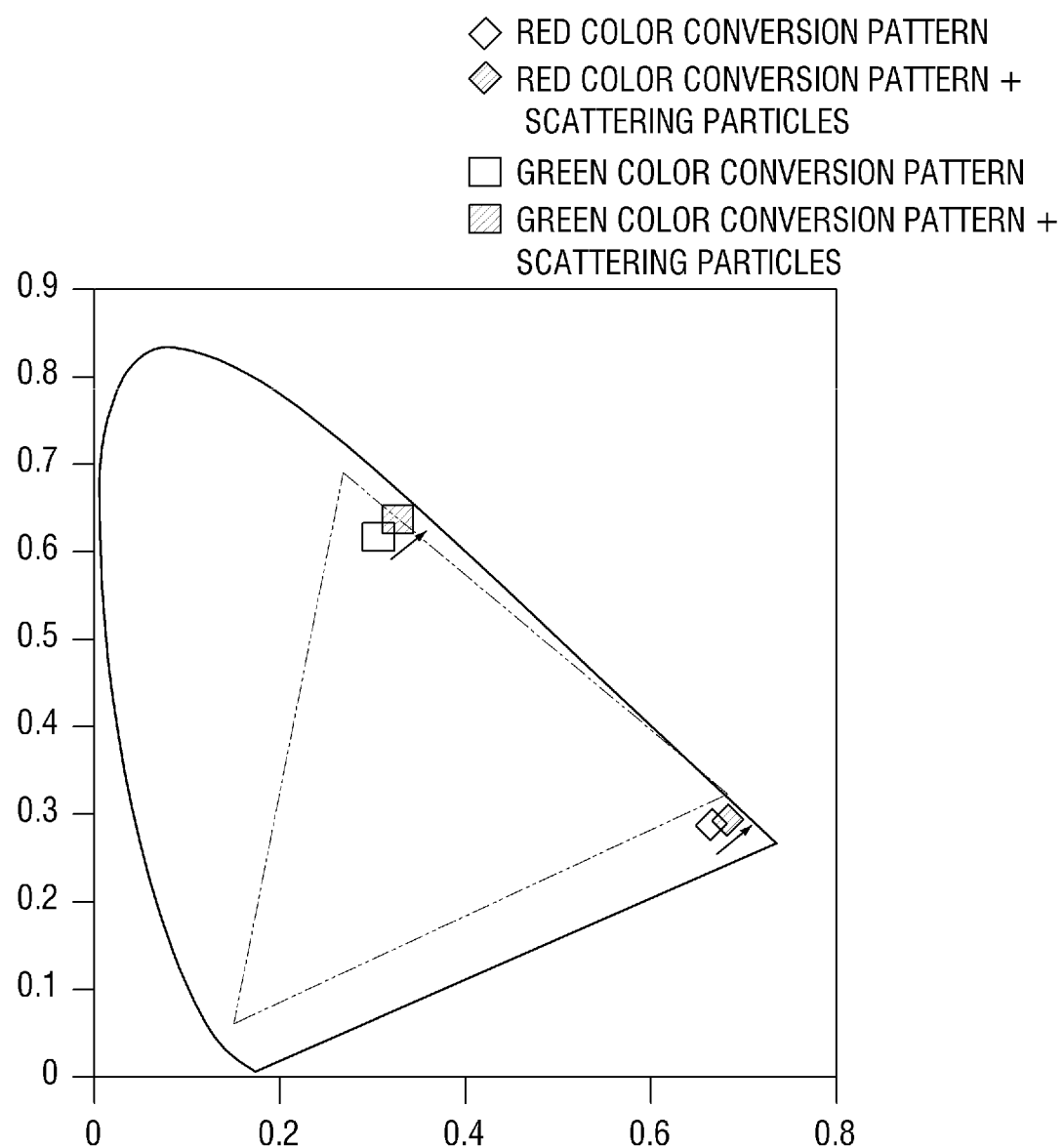
FIG. 10 is a chromaticity diagram showing the color coordinates of the light exiting through the first pixel region and the second pixel region in the structure in which the light-transmitting layer covers the color conversion patterns, as shown in FIG. 6.

FIG. 10 is a chromaticity diagram showing the color coordinates of the light exiting through the first pixel region and the second pixel region in the structure in which the light-transmitting layer covers the color conversion patterns, as shown in FIG. 6.

As can be seen from the color coordinates shown in FIG. 10, the color gamut of the red light may be improved in the structure in which the red color conversion pattern includes scattering particles of the light-transmitting layer over the structure in which only the red color conversion pattern is employed.

Likewise, it can be seen that the color gamut of the green light may be improved in the structure in which the green color conversion pattern includes scattering particles of the light-transmitting layer over the structure in which only the green color conversion pattern is employed.

As described above, the display device 1 according to an exemplary embodiment includes the light-transmitting layer 240 containing the scattering particles SC and disposed to cover the color conversion patterns 230a and 230b, such that when the blue light BL provided from the backlight unit 20 is incident on the light-transmitting layer 240 as the vertically incidence light OL, it is scattered in the horizontal direction by the scattering particles SC to be incident on the color conversion patterns 230a and 230b.

Accordingly, the light path of the blue light BL, which is produced as the incident light OL is scattered in the horizontal direction, may be increased, and the number of photons in contact with the quantum dots QD1 and QD2 of the color conversion patterns 230a and 230b may be increased.

As a result, the efficiency of color conversion by the color conversion patterns 230a and 230b may be increased, such that the color gamut of the display device 1 may be increased.

Hereinafter, various exemplary embodiments of area A of FIG. 5 will be described.

FIGS. 11, 12, 13, 14, 15, and 16 are cross-sectional views showing various exemplary embodiments of area A of FIG. 5.

Figure 11:
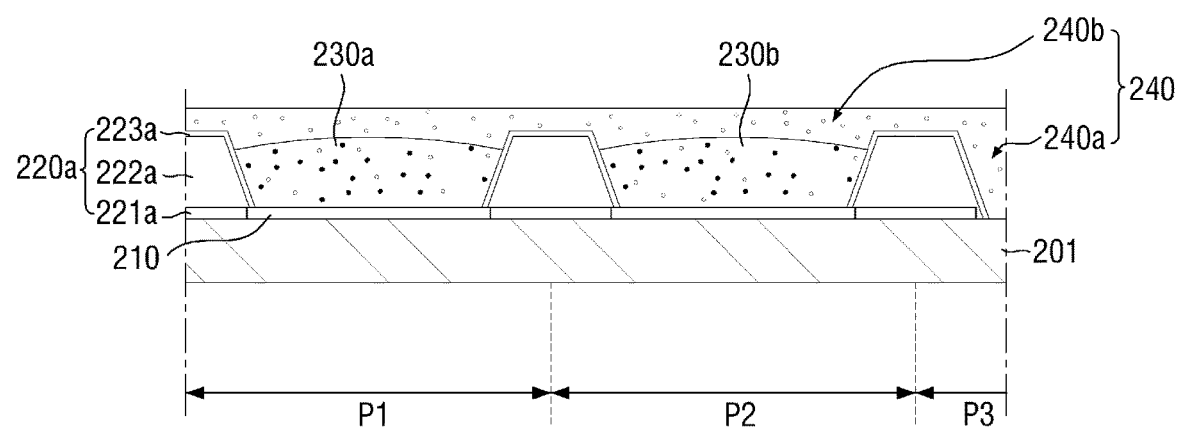
FIGS. 11, 12, 13, 14, 15, and 16 are cross-sectional views showing various exemplary embodiments of area A of FIG. 5.

FIG. 11 shows an example in which a light-blocking partition 220a includes a transparent material layer 222a, a reflective layer 223a surrounding the transparent material layer 222a, and a black material layer 221a disposed between the second substrate 201 and the transparent material layer 222a. The reflective layer 223a may be made of a metallic material or an inorganic material.

The light-blocking partition 220a may allow the height of the black material layer 221a to be decreased. Accordingly, there is an advantage in the case where it is difficult to form a high light-blocking partition when the light-blocking partition is made of a black material by photolithography since the black material absorbs light during an exposure process.

The display device having the light-blocking partition 220a as described above may provide the same effects as those achieved by the display device according to the above-described exemplary embodiment in which the light-transmitting layer including the scattering particles covers the color conversion patterns.

Figure 12:
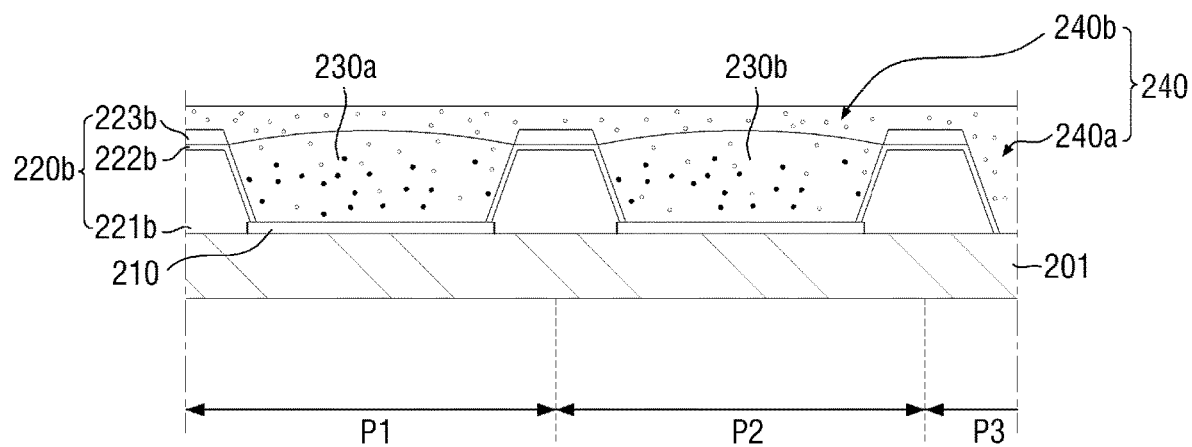

FIG. 12 shows an example in which a light-blocking partition 220b includes a transparent material layer 221b, a reflective layer 222b surrounding the transparent material layer 221b, and a black material layer 223b disposed on the reflective layer 222b so that it overlaps with the transparent material layer 221b.

The light-blocking partition 220b may also allow the height of the black material layer 223b to be lowered. Accordingly, there is an advantage in the case where it is difficult to form a high light-blocking partition when the light-blocking partition is made of a black material by photolithography since the black material absorbs light during an exposure process.

The display device having the light-blocking partition 220b as described above may provide the same effects as those achieved by the display device according to the above-described exemplary embodiment in which the light-transmitting layer including the scattering particles covers the color conversion patterns.

Figure 13:
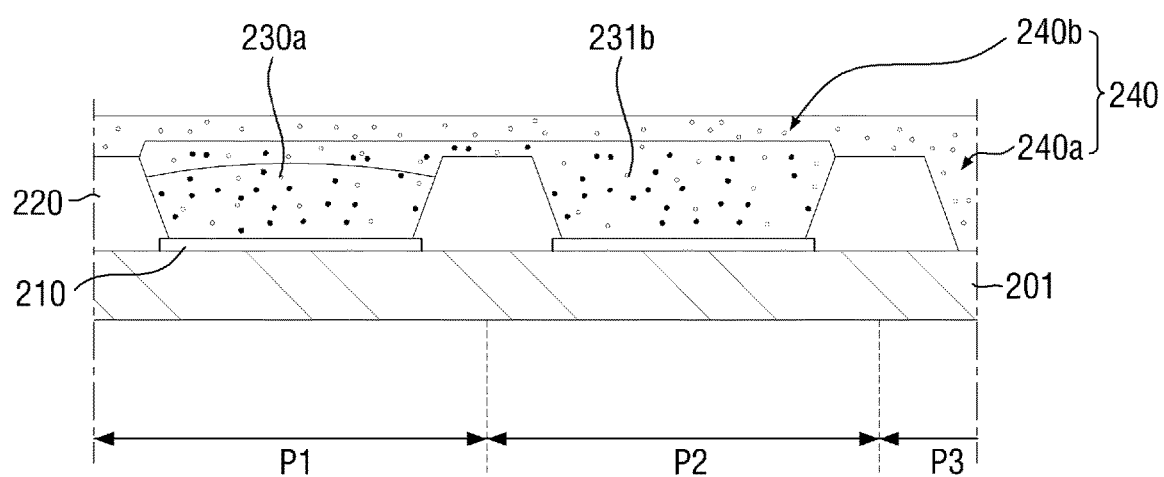

FIG. 13 shows an example in which a green color conversion pattern 231b extends to cover a red color conversion pattern 230a. In this example, the green color conversion pattern 231b may be interposed between the second portion 240b of the light-transmitting layer 240 and the red color conversion pattern 230a in the first pixel region P1.

In the display device having this structure, the optical path through the color conversion pattern in the first pixel region P1 may be increased, and thus the efficiency of the color conversion of the light can be increased.

Figure 14:
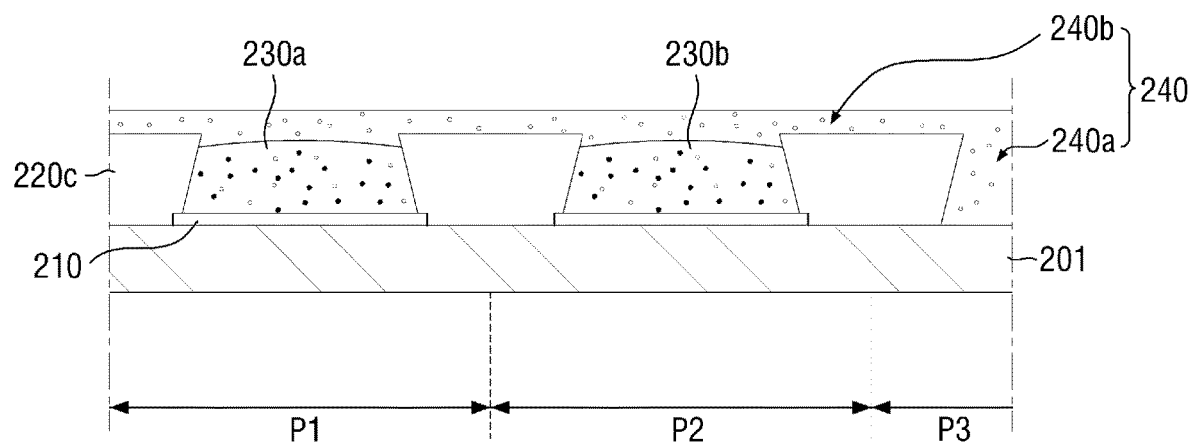

FIG. 14 shows an example in which a light-blocking partition 220c has a shape that becomes wider as the distance from the second substrate 201 increases and the distance towards the color conversion patterns 230a and 230b decreases.

The light-blocking partition 220c may increase the path via which the light exiting from the color conversion pattern of a pixel region may leak to another adjacent pixel region.

The display device having the light-blocking partition 220c may reduce leakage of the light into an adjacent pixel region, thereby reducing undesirable color mixture.

Figure 15:
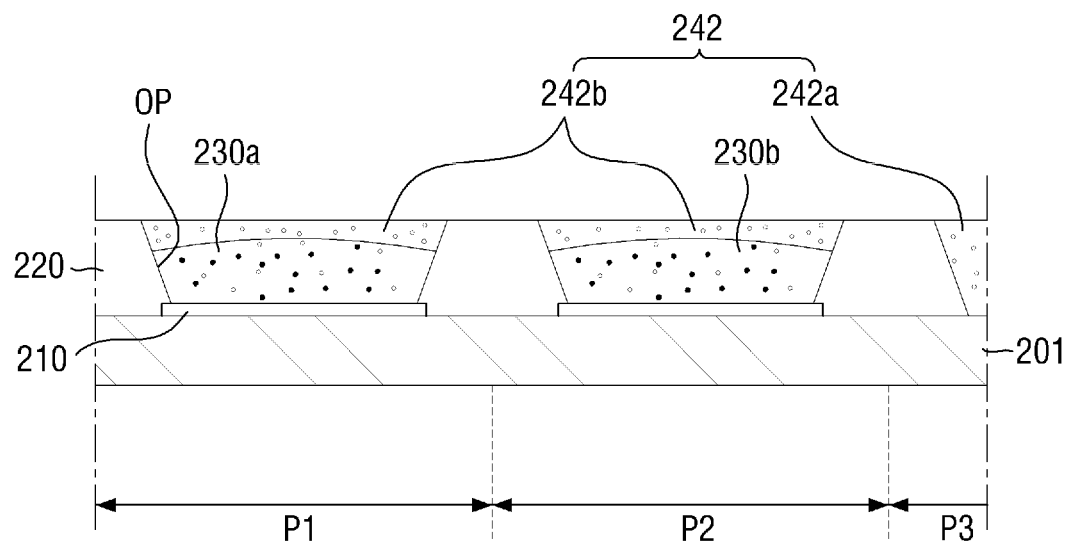

FIG. 15 shows an example in which a first portion 242a is separated from a second portion 242b of the light-transmitting layer 242. Specifically, the second portion 242b may be limited to the opening OP of the light-blocking partition 220 in each of the first pixel region P1 and the second pixel region P2.

For example, one surface of the light-blocking partition 220 at the boundary between adjacent ones of the first pixel region P1, the second pixel region P2, and the third pixel region P3, one surface of the second portion 242b overlapping with the color conversion patterns 230a and 230b, and one surface of the first portion 242a may be located at the same level. The surface of the light-blocking partition 220 may be defined as described above. The surface of the second portion 242b may be defined as a surface that includes the farthest point from the surface of the second substrate 201 in the direction perpendicular to the surface of the second substrate 201. The surface of the first portion 242a may be defined as a surface that includes the farthest point from the surface of the second substrate 201 in the direction perpendicular to the surface of the second substrate 201.

The display device having the light-transmitting layer 242 may reduce leakage of the light into an adjacent pixel region, thereby reducing undesirable color mixture.

Figure 16:
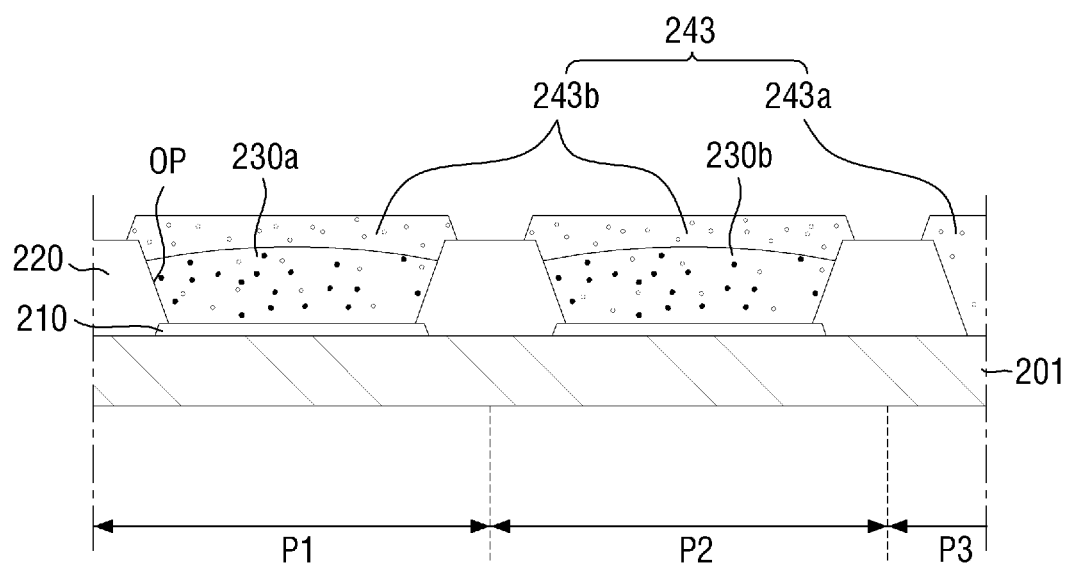

FIG. 16 shows an example in which a light-transmitting layer 243 includes a first portion 243a and a second portion 243b spaced apart from each other, and the first portion 243a and the second portion 243b covers a part of the surface of the light-blocking partition 220 at the boundaries between adjacent ones of the first pixel region P1, the second pixel region P2, and the third pixel region P3.

The display device having the light-transmitting layer 243 can reduce leakage of the light into an adjacent pixel region to thereby reduce undesirable color mixture, and can also increase the efficiency of color conversion by the color conversion patterns 230a and 230b by way of using more scattering particles SC than the light-transmitting layer 242 of FIG. 15 to allow the vertically incident light OL (see FIG. 7) to be scattered more so that it is scattered in the horizontal direction more efficiently.

Hereinafter, a method for fabricating a second display panel of a display device according to an exemplary embodiment will be described.

FIGS. 17, 18, 19, 20, 21, and 22 are cross-sectional views for illustrating a method for fabricating a second display panel of a display device according to an exemplary embodiment.

Figure 17:
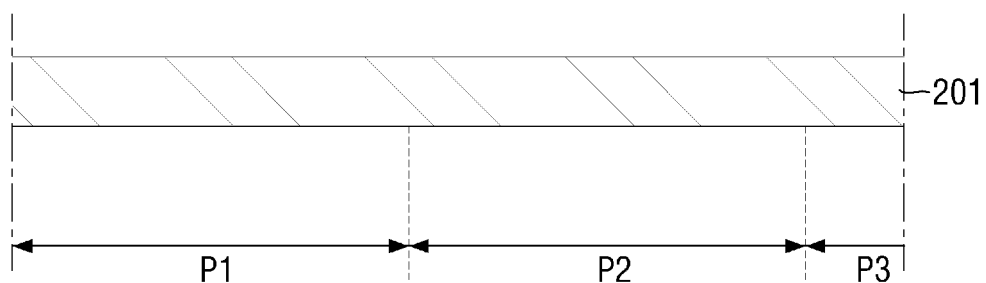
FIGS. 17, 18, 19, 20, 21, and 22 are cross-sectional views for illustrating a method for fabricating a second display panel of a display device according to an exemplary embodiment.

Referring to FIG. 17, a second substrate 201 is prepared. The second substrate 201 includes a plurality of pixel regions P (see FIG. 2). The plurality of pixel regions P (see FIG. 2) may include the first pixel region P1, the second pixel region P2, and a third pixel region P3. The second substrate 201 has been described in above, and thus redundant description will be omitted.

Figure 18:
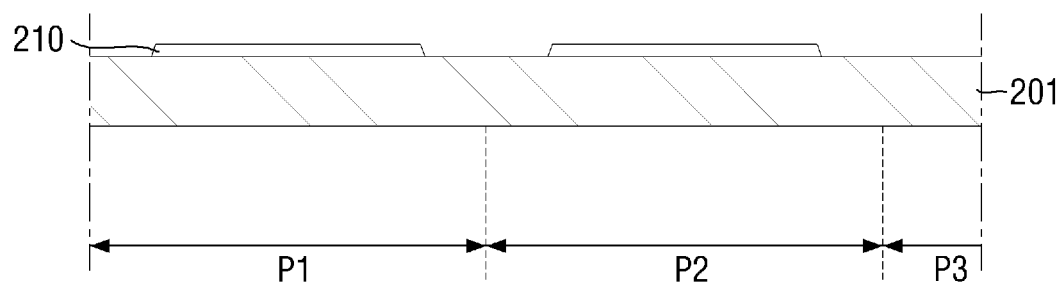

Subsequently, referring to FIG. 18, a light-filtering pattern 210 is formed on the second substrate 201 in each of the first and second pixel regions P1 and P2. The light-filtering pattern 210 may be a blue cut-off filter. The light-filtering pattern 210 may be formed by photolithography, inkjet printing, or the like.

Figure 19:
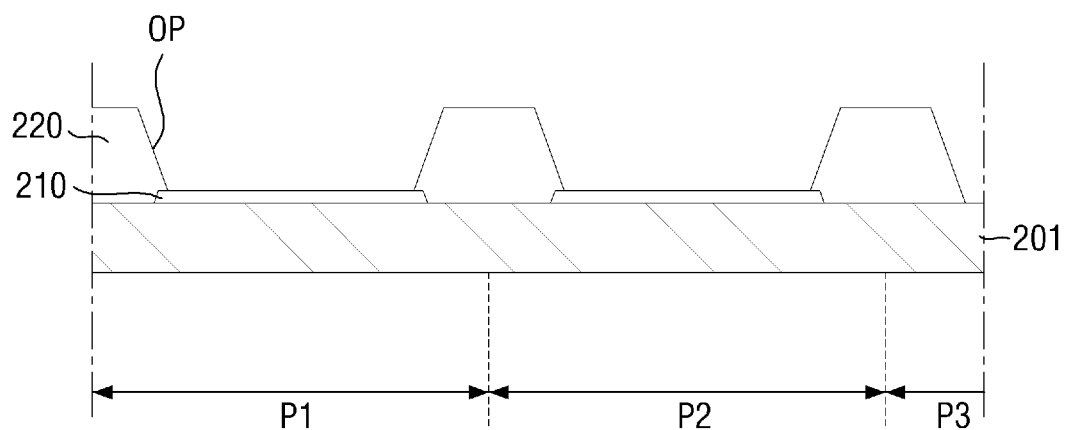

Subsequently, referring to FIG. 19, a light-blocking partition 220 is formed on the second substrate 201, which has a plurality of openings OP via which the first pixel region P1, the second pixel region P2, and the third pixel region P3 are exposed.

The light-blocking partition 220 may expose the light-filtering pattern 210 via the openings OP in the first pixel region P1 and the second pixel region P2, and may exposed a part of the second substrate 201 via the opening OP in the third pixel region P3. The light-blocking partition 220 may have such a height that the opening can be sufficiently filled with a solution used for inkjet printing of the color conversion patterns 230a and 230b. The light-blocking partition 220 may be formed by photolithography.

Figure 20:
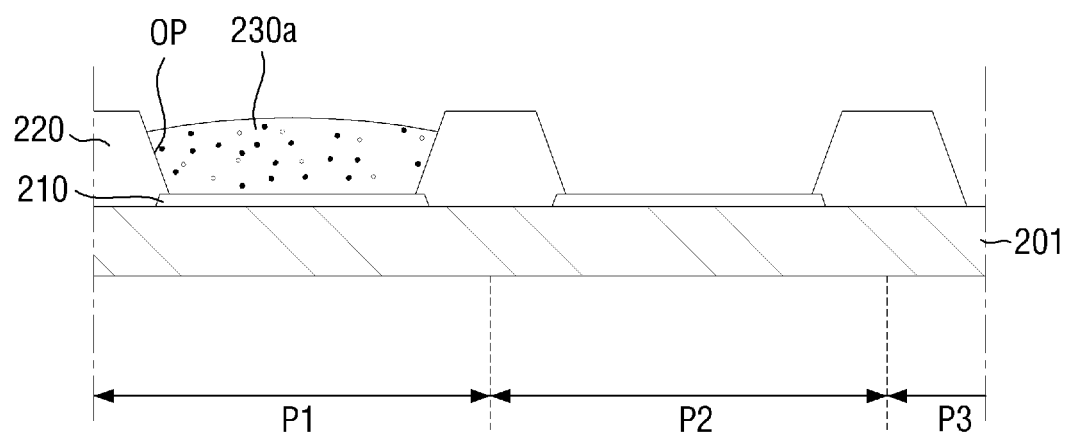

Subsequently, referring to FIG. 20, a red color conversion pattern 230a is formed in the opening OP of the light-blocking partition 220 in the first pixel region P1. The red color conversion pattern 230a may be formed by inkjet printing. The inkjet printing method can simplify the process of forming the color conversion pattern as compared with the photolithography method.

Figure 21:
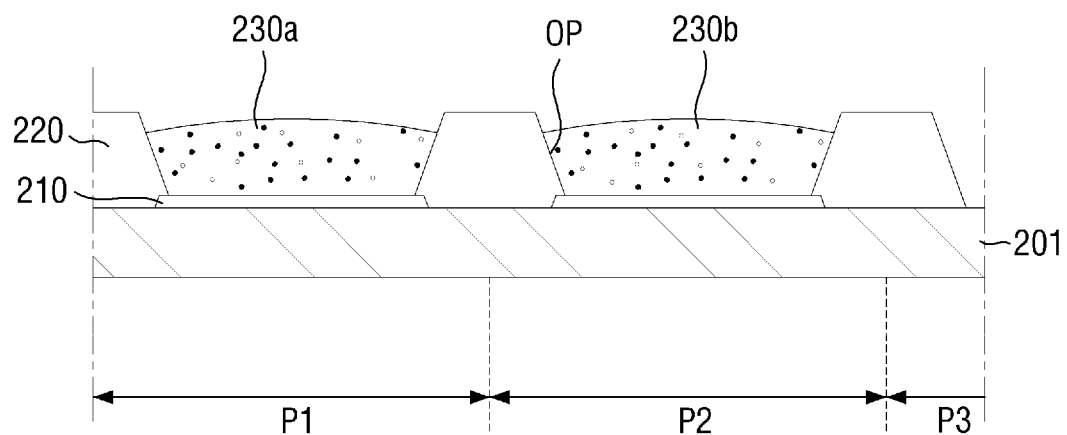

Subsequently, referring to FIG. 21, a green color conversion pattern 230b is formed in the opening OP of the light-blocking partition 220 in the second pixel region P2. The green color conversion pattern 230b may be formed by inkjet printing.

Figure 22:
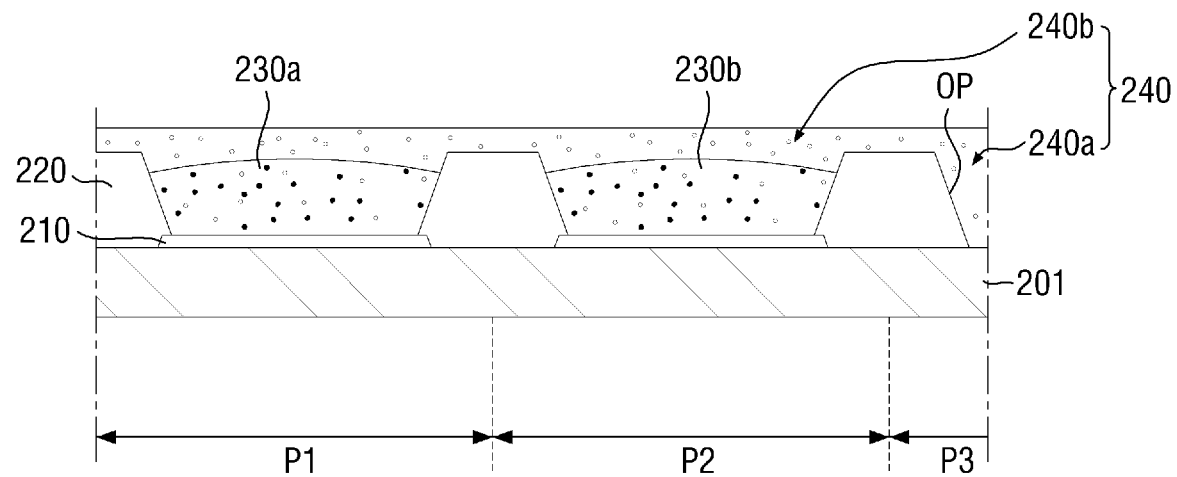

Subsequently, referring to FIG. 22, a light-transmitting layer 240 is formed, which includes a first portion 240a disposed in the opening OP of the light-blocking partition 220 in the third pixel region P3, and a second portion 240b disposed to cover the color conversion patterns 230a and 230b.

The first portion 240a may be continuously connected to the second portion 240b. The light-transmitting layer 240 including the first portion 240a and the second portion 240b may be formed by inkjet printing or slit coating. For example, when the light-transmitting layer 240 is formed by inkjet printing, a light-transmitting solution may be ejected entirely onto the light-blocking partition 220. Accordingly, there may be an advantage in that it is not necessary to manage the process so that a light-transmitting solution does not overflow to an adjacent pixel region, e.g., the pixel region P2.

Although not shown in the drawings, an overcoat layer 250, a protective layer 260, a second polarizer 270, a capping layer 280, a common electrode 290, and a second alignment layer are formed on the light-transmitting layer sequentially.

According to an exemplary embodiment, the efficiency of color conversion may be increased, such that color gamut may be increased.

Although certain exemplary embodiments and implementations have been described herein, other embodiments and modifications will be apparent from this description.

Accordingly, the inventive concept is not limited to such embodiments, but rather to the broader scope of the presented claims and various obvious modifications and equivalent arrangements as would be apparent to a person of ordinary skill in the art.

What is claimed is:

1. A color conversion panel, comprising:
a substrate comprising a first region, a second region, and a blue pixel region;
a color conversion pattern disposed on a surface of the substrate in each of the first region and the second region, respectively; and
a light-transmitting layer comprising a first portion disposed in the blue pixel region, and a second portion covering the color conversion pattern disposed in the first and second regions of the substrate,
wherein the first portion and the second portion of the light-transmitting layer comprise scattering particles,
wherein each of the first portion and the second portion of the light-transmitting layer includes a first surface facing the surface of the substrate, and
wherein the first surface of the first portion of the light-transmitting layer in the blue pixel region is closer to the surface of the substrate than the first surface of the second portion of the light-transmitting layer in the first and second regions.

2. The color conversion panel of claim 1, wherein the color conversion pattern is disposed between the substrate and the second portion, and
wherein a thickness of the second portion of the light-transmitting layer in the first and second regions is less than a thickness of the first portion of the light-transmitting layer in the blue pixel region.

3. The color conversion panel of claim 1, further comprising a light-blocking partition disposed on the substrate and having a plurality of openings exposing the first region, the second region, and the blue pixel region,
wherein the color conversion pattern is disposed in each of the openings in the first region and the second region, respectively,
wherein the first portion of the light-transmitting layer is disposed in the opening exposing the blue pixel region, and
wherein a vertical distance from a surface of the substrate to a highest point of the color conversion pattern is equal to, or less than, a vertical distance from the surface of the substrate to a highest point of the light-blocking partition.

4. The color conversion panel of claim 1, wherein the first portion of the light-transmitting layer is continuously connected to the second portion of the light-transmitting layer.

5. The color conversion panel of claim 4, further comprising a light-blocking partition disposed on the substrate and having a plurality of openings exposing the first region, the second region, and the blue pixel region,
wherein the color conversion pattern is disposed in each of the openings in the first region and the second region, respectively,
wherein the light-blocking partition between the first region and the second region has a ratio of b to a (b/a) of 0.5 or less, and
wherein "a" denotes a minimum width between a boundary at which a surface of the color conversion pattern disposed in the first region meets the light-blocking partition and a boundary at which a surface of the color conversion pattern disposed in the second region meets the light-blocking partition, and "b" denotes a thickness of a portion of the light-transmitting layer overlapping the light-blocking partition.

6. The color conversion panel of claim 1, wherein the first portion of the light-transmitting layer is spaced apart from the second portion of the light-transmitting layer.

7. The color conversion panel of claim 6, further comprising a light-blocking partition disposed on the substrate and having a plurality of openings exposing the first region, the second region, and the blue pixel region,
wherein the color conversion pattern is disposed in each of the openings in the first region and the second region, respectively, and
wherein a surface of the light-blocking partition is flush with a surface of the second portion of the light-transmitting layer which overlaps with the color conversion pattern.

8. The color conversion panel of claim 6, wherein the second portion of the light-transmitting layer overlaps a part of a surface of the light-blocking partition.

9. The color conversion panel of claim 1, further comprising a light-blocking partition disposed on the substrate and having a plurality of openings exposing the first region, the second region, and the blue pixel region,
wherein the color conversion pattern is disposed in each of the openings in the first region and the second region, respectively, and
wherein the light-blocking partition has a shape that becomes narrower as a distance from the substrate increases and a distance from the color conversion pattern decreases, or becomes wider as a distance from the substrate increases and a distance from the color conversion pattern decreases.

10. The color conversion panel of claim 1, further comprising a light-blocking partition disposed on the substrate and having a plurality of openings exposing the first region, the second region, and the blue pixel region,
wherein the color conversion pattern is disposed in each of the openings in the first region and the second region, respectively, and
wherein the light-blocking partition comprises a black material.

11. The color conversion panel of claim 1, further comprising a light-blocking partition disposed on the substrate and having a plurality of openings exposing the first region, the second region, and the blue pixel region,
wherein the color conversion pattern is disposed in each of the openings in the first region and the second region, respectively, and
wherein the light-blocking partition comprises a transparent material layer, and a reflective layer surrounding the transparent material layer.

12. The color conversion panel of claim 11, wherein the light-blocking partition further comprises a black material layer disposed between the substrate and the transparent material layer, or on the reflective layer.

13. The color conversion panel of claim 1, wherein the color conversion panel comprises quantum dots that convert light of one color into light of a different color.

14. The color conversion panel of claim 1, wherein the color conversion pattern comprises scattering particles.

15. The color conversion panel of claim 1, wherein the color conversion pattern comprises a red color conversion pattern disposed in the opening in the first region, and a green color conversion pattern disposed in the opening in the second region.

16. The color conversion panel of claim 15, wherein the green color conversion pattern extends to cover the red color conversion pattern, and wherein the green color conversion pattern is disposed between the second portion of the light-transmitting layer and the red color conversion pattern in the first region.

17. The color conversion panel of claim 1, further comprising a light-filtering pattern disposed between the substrate and the color conversion pattern.

18. The color conversion panel of claim 17, wherein the light-filtering pattern is a blue cut-off filter.

19. A display device, comprising:
a first substrate and a second substrate facing each other and comprising a first pixel region, a second pixel region, and a blue pixel region;
a pixel electrode disposed on the first substrate and disposed in each of the first pixel region, the second pixel region, and the blue pixel region;
a color conversion pattern disposed on a surface of the second substrate that faces the pixel electrode in each of the first pixel region and the second pixel region, respectively; and
a light-transmitting layer comprising a first portion disposed in the blue pixel region, and a second portion disposed to cover the color conversion pattern on the surface of the second substrate,
wherein the first and second portions of the light-transmitting layer comprise scattering particles,
wherein each of the first portion and the second portion of the light-transmitting layer includes a first surface facing the surface of the second substrate, and
wherein the first surface of the first portion of the light-transmitting layer in the blue pixel region is closer to the surface of the second substrate than the first surface of the second portion of the light-transmitting layer in the first pixel region and the second pixel region.

20. The display device of claim 19, wherein the color conversion pattern is disposed between the second substrate and the second portion, and wherein a thickness of the second portion of the light-transmitting layer in the in the first pixel region and the second pixel region is smaller than a thickness of the first portion of the light-transmitting layer in the blue pixel region.

21. The display device of claim 19, further comprising a light-blocking partition disposed on the surface of the second substrate and comprising a plurality of openings exposing the first pixel region, the second pixel region, and the blue pixel region, wherein the color conversion pattern is disposed in each of the openings in the first pixel region and the second pixel region, respectively, wherein the first portion of the light-transmitting layer is disposed in the opening exposing the blue pixel region, and wherein a vertical distance from the surface of the second substrate to a highest point of each of the color conversion pattern is equal to, or less than, a vertical distance from the surface of the second substrate to a highest point of the light-blocking partition.

22. The display device of claim 19, wherein the first portion of the light-transmitting layer is continuously connected to the second portion of the light-transmitting layer.

23. The display device of claim 22, further comprising a light-blocking partition disposed on the surface of the second substrate and comprising a plurality of openings exposing the first pixel region, the second pixel region, and the blue pixel region, wherein the color conversion pattern is disposed in each of the openings in the first pixel region and the second pixel region, respectively, wherein the light-blocking partition between the first pixel region and the second pixel region has a ratio of b to a (b/a) of 0.5 or less, and wherein "a" denotes a minimum width between a boundary at which a surface of the color conversion pattern disposed in the first region meets the light-blocking partition and a boundary at which a surface of the color conversion pattern disposed in the second region meets the light-blocking partition, and "b" denotes a thickness of a portion of the light-transmitting layer overlapping the light-blocking partition.

24. The display device of claim 19, wherein the first portion of the light-transmitting layer is spaced apart from the second portion of the light-transmitting layer.

25. The display device of claim 24, further comprising a light-blocking partition disposed on the surface of the second substrate and comprising a plurality of openings exposing the first pixel region, the second pixel region, and the blue pixel region, wherein the color conversion pattern is disposed in each of the openings in the first pixel region and the second pixel region, respectively, and wherein a surface of the light-blocking partition is flush with a surface of the second portion of the light-transmitting layer which overlaps with the color conversion pattern.

26. The display device of claim 24, further comprising a light-blocking partition disposed on the surface of the second substrate and comprising a plurality of openings exposing the first pixel region, the second pixel region, and the blue pixel region, wherein the second portion of the light-transmitting layer overlaps a part of a surface of the light-blocking partition.

27. The display device of claim 24, wherein the color conversion pattern comprises a red color conversion pattern disposed in the first pixel region, and a green color conversion pattern disposed in the second pixel region.

28. The display device of claim 27, wherein the green color conversion pattern extends to cover the red color conversion pattern, and wherein the green color conversion pattern is disposed between the second portion of the light-transmitting layer and the red color conversion pattern in the first pixel region.

29. A display device, comprising:
a first substrate and a second substrate facing each other and comprising a first pixel region, a second pixel region, and a blue pixel region;
a pixel electrode disposed on a surface of the first substrate that faces the second substrate, the pixel electrode disposed in each of the first pixel region, the second pixel region, and the blue pixel region;
a blue cut-off filter disposed directly on a surface of the second substrate that faces the pixel electrode in each of the first pixel region and the second pixel region, respectively;
a color conversion pattern disposed on the blue cut-off filter in each of the first pixel region and the second pixel region, respectively; and a light-transmitting layer comprising a first portion disposed in the blue pixel region, and a second portion disposed to cover the color conversion pattern,
wherein the first portion of the light-transmitting layer and the second portion of the light-transmitting layer comprise scattering particles, and
wherein the color conversion pattern is disposed between the blue cut-off filter and the second portion of the light-transmitting layer.

* * * * *